(12) United States Patent
Shimezawa et al.

(10) Patent No.: US 11,991,666 B2
(45) Date of Patent: May 21, 2024

(54) COMMUNICATIONS DEVICES, METHODS OF OPERATING COMMUNICATIONS DEVICES, INFRASTRUCTURE EQUIPMENT AND METHODS

(71) Applicant: Sony Corporation, Tokyo (JP)

(72) Inventors: Kazuyuki Shimezawa, Basingstoke (GB); Shin Horng Wong, Basingstoke (GB); Martin Warwick Beale, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 321 days.

(21) Appl. No.: 17/274,824

(22) PCT Filed: Sep. 17, 2019

(86) PCT No.: PCT/EP2019/074900
§ 371 (c)(1),
(2) Date: Mar. 10, 2021

(87) PCT Pub. No.: WO2020/064438
PCT Pub. Date: Apr. 2, 2020

(65) Prior Publication Data
US 2022/0053459 A1    Feb. 17, 2022

(30) Foreign Application Priority Data
Sep. 27, 2018    (EP) .................................. 18197372

(51) Int. Cl.
*H04W 72/02* (2009.01)
*H04W 72/1268* (2023.01)
(Continued)

(52) U.S. Cl.
CPC ....... *H04W 72/02* (2013.01); *H04W 72/1268* (2013.01); *H04W 72/569* (2023.01); *H04L 1/1812* (2013.01)

(58) Field of Classification Search
CPC ............. H04W 72/02; H04W 72/1242; H04W 72/1268
See application file for complete search history.

(56) References Cited

U.S. PATENT DOCUMENTS

2019/0261354 A1 * 8/2019 Fakoorian ............. H04L 1/1671
2019/0313419 A1 * 10/2019 Fakoorian ............. H04B 1/713
(Continued)

FOREIGN PATENT DOCUMENTS

| | | |
|---|---|---|
| CN | 105264937 A | 1/2016 |
| CN | 110192422 A | 8/2019 |

(Continued)

OTHER PUBLICATIONS

International Search Report and Written Opinion dated Nov. 21, 2019, received for PCT Application PCT/EP2019/074900 Filed on Sep. 17, 2019, 10 pages.

(Continued)

*Primary Examiner* — Kevin M Cunningham
(74) *Attorney, Agent, or Firm* — XSENSUS LLP

(57) ABSTRACT

A method of operating a communications device to transmit data to a wireless communications network comprises processing uplink data for transmission on grant free resources of a physical uplink shared channel of a wireless access interface provided by the wireless communications network to form one or more transport blocks of the uplink data for transmission. The method comprises selecting one of a plurality of configurations for transmitting the uplink data in the grant free resources, and transmitting the uplink data in the grant free resources according to the selected configuration.

19 Claims, 16 Drawing Sheets

(51) Int. Cl.
*H04W 72/566* (2023.01)
*H04L 1/1812* (2023.01)

(56) References Cited

U.S. PATENT DOCUMENTS

| | | | |
|---|---|---|---|
| 2020/0045722 A1* | 2/2020 | Bae | H04W 72/1284 |
| 2020/0053730 A1* | 2/2020 | Hosseini | H04L 5/0044 |
| 2020/0100279 A1* | 3/2020 | Al-Imari | H04W 72/14 |

FOREIGN PATENT DOCUMENTS

| | | |
|---|---|---|
| KR | 20140116435 A | 10/2014 |
| WO | WO-2018143738 A1 | 8/2018 |

OTHER PUBLICATIONS

Intel Corporation, "Enhancements to Configured Grant PUSCH", 3GPP TSG RAN WG1 Meeting #94, R1-1808707, Aug. 20-24, 2018, pp. 1-4.

Nokia et al., "On Configured Grant Enhancements for NR URLLC", 3GPP TSG RAN WG1 Meeting #94, R1-1808570, Aug. 20-24, 2018, 6 pages.

Sony, "On Enhancement of UL Grant-Free Transmissions", 3GPP TSG RAN WG1 Meeting #94, R1-1808345, Aug. 20-24, 2018, 2 pages.

3GPP, "NR; Physical Layer Procedures for Data (Release 15)", TS 38.214 V15.3.0, Sep. 2018, pp. 1-96.

Huawei et al. "New SID on Physical Layer Enhancements for NR URLLC", 3GPP TSG-RAN#80, RP-181477, Jun. 11-14, 2018, 5 pages.

NTT DOCOMO, Inc. "Summary of 7.2.6.3 Enhanced UL Grant-Free Transmissions", 3GPP TSG RAN WG1 Meeting #94, R1-1809979, Aug. 20-24, 2018, 20 pages.

Holma et al. "LTE for UMTS OFDMA and SC-FDMA Based Radio Access", John Wiley and Sons, 2009, pp. 25-27.

NTT DOCOMO, Inc. "Work Item on New Radio (NR) Access Technology", 3GPP TSG RAN Meeting #78, RP-172834, Dec. 18-21, 2017.

Intel Corporation; "Title: Enhancements to configured grant PUSCH", 3GPP TSG RAN WG1Meeting #94; R1-1808707; Agenda item: 7.2.6.3, Document for: Discussion and Decision; Gothenburg, Sweden, Aug. 20-24, 2018; 4 pages.

Ericcson, URLLC techniques for PUSCH , 3GPP TSG RAN WG1#92, R1-1802881, Feb. 16, 2018, 12 pgs., Athens Greece.

Huawei, HiSilicon , Enhanced UL configured grant transmissions , 3GPP TSG RAN WG1#94, R1-1808100 , Aug. 11, 2018, 8 pgs., Gothenberg Sweden.

Huawei, HiSilicon , Views on NR URLLC work in Rel-16 , 3GPP TSG RAN#80 RP-180889 , Jun. 4, 2018, 16 pgs., LaJolla CA.

Panasonic , On NR URLLC L1 enhancements , 3GPP TSG RAN WG1#94 R1-1808827 , Aug. 10, 2018, 10 pgs., Atehns Greece.

VIVO , UL data transmission procedure , 3GPP TSG RAN WG1#90b, R1-1717500 , Oct. 3, 2017, 15 pgs., Prague CZ.

* cited by examiner

COMMUNICATIONS DEVICES, METHODS OF OPERATING COMMUNICATIONS DEVICES, INFRASTRUCTURE EQUIPMENT AND METHODS

CROSS-REFERENCE TO RELATED APPLICATIONS

The present application is based on PCT filing PCT/EP2019/074900, filed Sep. 17, 2019, which claims priority to EP 18197372.8, filed Sep. 27, 2018, the entire contents of each are incorporated herein by reference.

BACKGROUND

Field of Disclosure

The present disclosure relates to communications devices, methods of operating communications devices, infrastructure equipment and methods for communicating uplink data using grant free resources in wireless communications networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to support efficient connectivity for a wide range of devices associated with different applications and different characteristic data traffic profiles to support different services.

One example of a new service is referred to as Ultra Reliable Low Latency Communications (URLLC) services which, as its name suggests, requires that a data unit or packet be communicated with a high reliability and with a low communications delay. URLLC type services therefore represent a challenging example for both LTE type communications systems and 5G/NR communications systems.

The increasing use of different types of terminal devices associated with different traffic profiles gives rise to new challenges for efficiently handling communications in wireless telecommunications systems that need to be addressed. For example grant free resources have been provided for transmitting uplink data as well as downlink data, which can reduce a latency of transmitting the uplink/downlink data. However some further adaptation may be required for transmission and reception of data to take advantage of the lower latency can be achieved using grant fee resources.

SUMMARY OF THE DISCLOSURE

The present disclosure can help address or mitigate at least some of the issues discussed above.

Embodiments of the present technique can provide a method of operating a communications device to transmit data to a wireless communications network, the method comprising processing uplink data for transmission on grant free resources of a physical uplink shared channel of a wireless access interface provided by the wireless communications network to form one or more transport blocks of the uplink data for transmission. The grant free resources provide communications resources of the physical shared uplink channel in each of a plurality of time divided units of the wireless access interface for transmitting the uplink data. The method comprises selecting one of a plurality of configurations for transmitting the uplink data in the grant free resources, and transmitting the uplink data in the grant free resources according to the selected configuration. Each of the plurality of configurations includes grant free resources, a transmission period in which each of the encoded data units is to be transmitted in the grant free resources, and a temporal starting position of the transmission period in one of the time divided units of the wireless access interface for transmitting the uplink data in the grant free resources, the temporal starting position and the transmission period being independent for each of the plurality of configurations. Providing independent configurations with independently set or different temporal starting positions and independently set or different transmission periods, a configuration can be selected to match a time of generation of the one or more transport blocks according to a required time when the uplink data should be transmitted. As a result the uplink data can be transmitted with a lower latency in the grant free resources.

According to other embodiments each of the plurality of configurations for transmitting the uplink data may include different communications parameters for transmitting the uplink data. According to other embodiments, each of the plurality of configurations for transmitting the uplink data in the grant free communications resources includes a relative priority for transmitting the uplink data with respect to transmitting the uplink data according to a different configuration. As such when there is a potential conflict for accessing the same uplink grant free resources, the transmitting of the uplink data with one of the configurations with a lower priority is adapted so that it does not conflict with the transmission of the uplink data with a configuration with a higher priority.

Embodiments of the present technique, which further relate to infrastructure equipment, communications devices as well as methods of operating communications devices, and infrastructure equipment, methods and circuitry for communications devices and infrastructure equipment, can provide an improvement in the transmission of uplink data using grant free communications resources.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
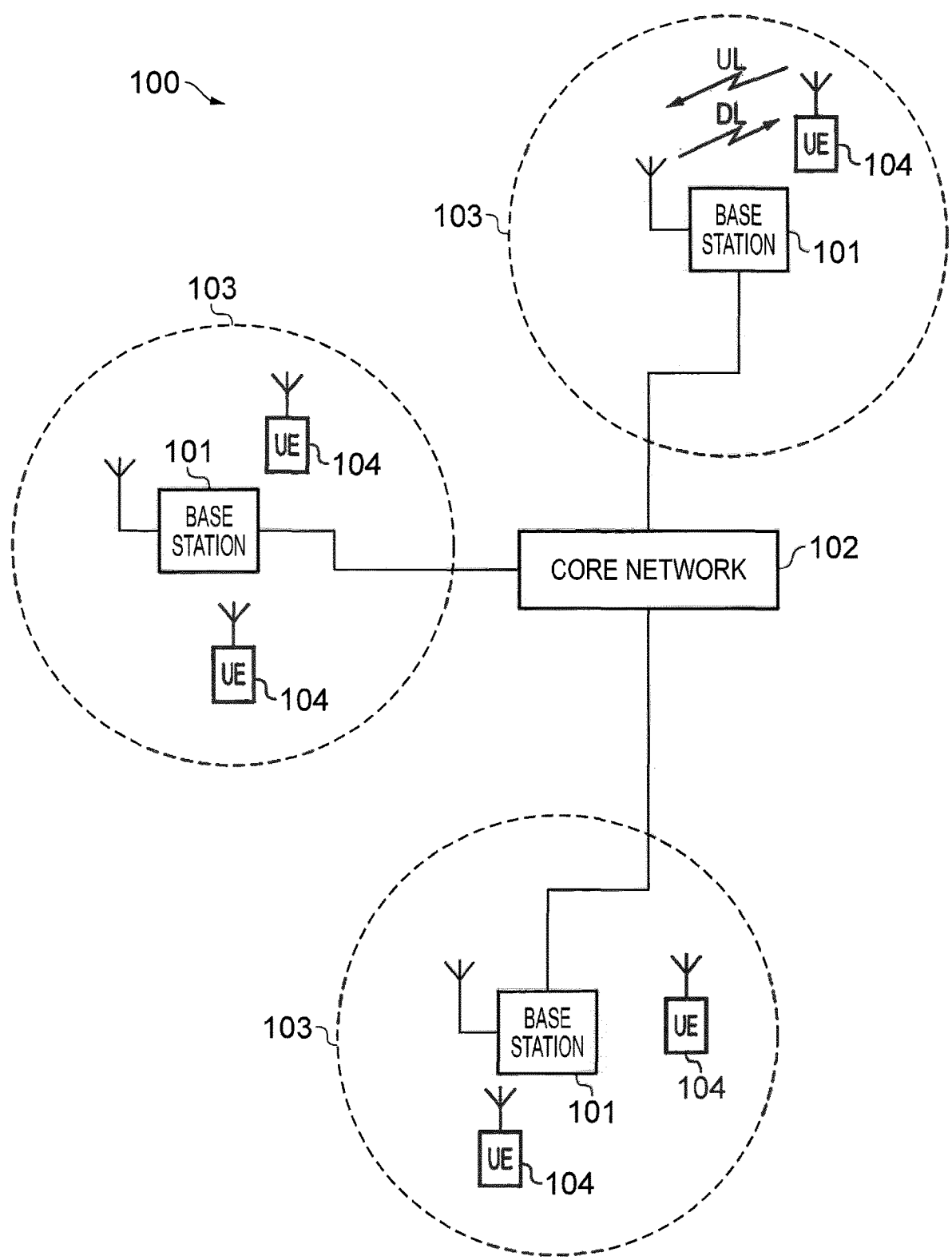
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink. Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, communications devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
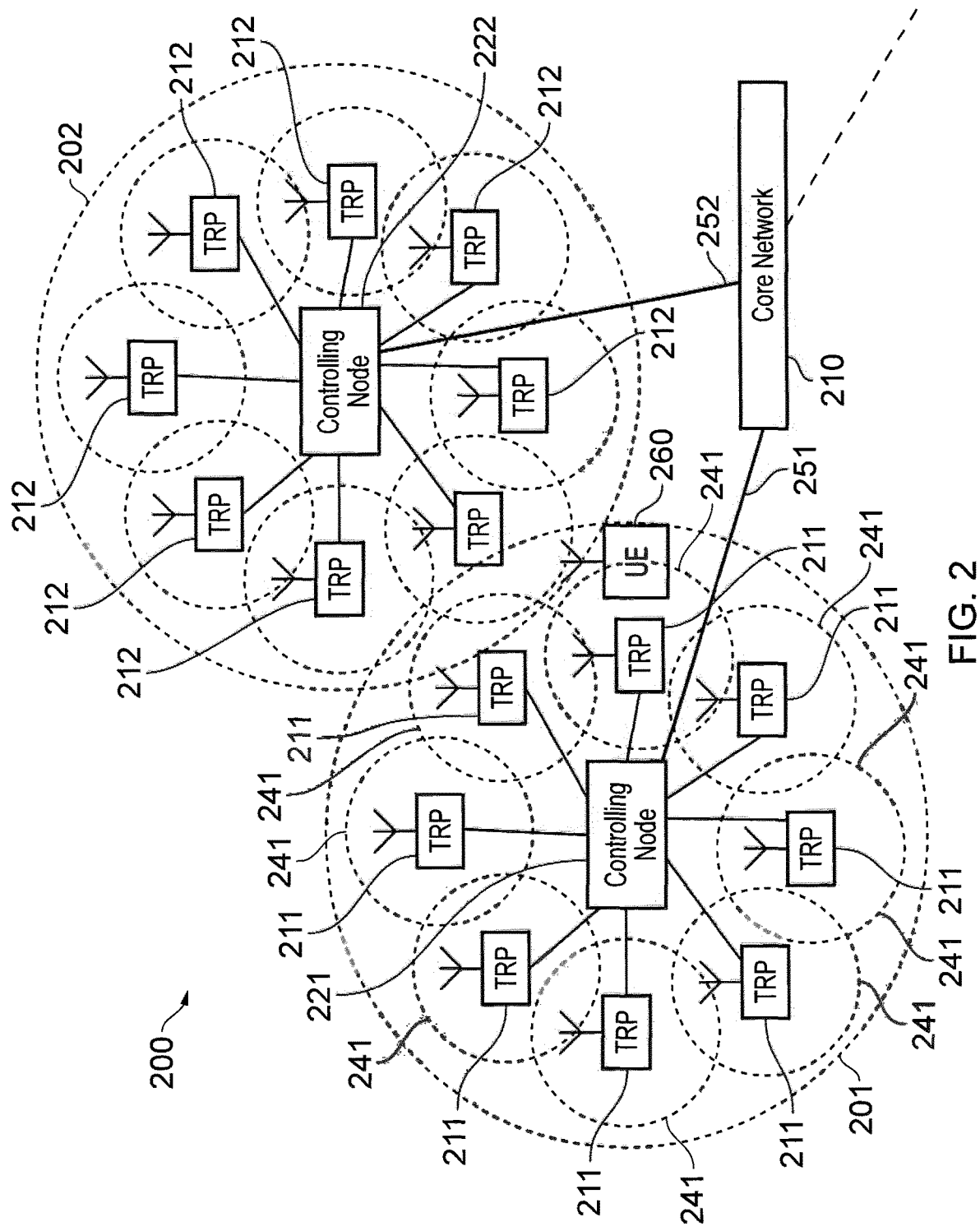
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 400 may thus exchange signalling with the first controlling node 221 in the first communication cell via one of the distributed units 211 associated with the first communication cell 201. In some cases communications for a given communications device are routed through only one of the distributed units, but it will be appreciated in some other implementations communications associated with a given communications device may be routed through more than one distributed unit, for example in a soft handover scenario and other scenarios.

In the example of FIG. 2, two communication cells 201, 202 and one communications device 400 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
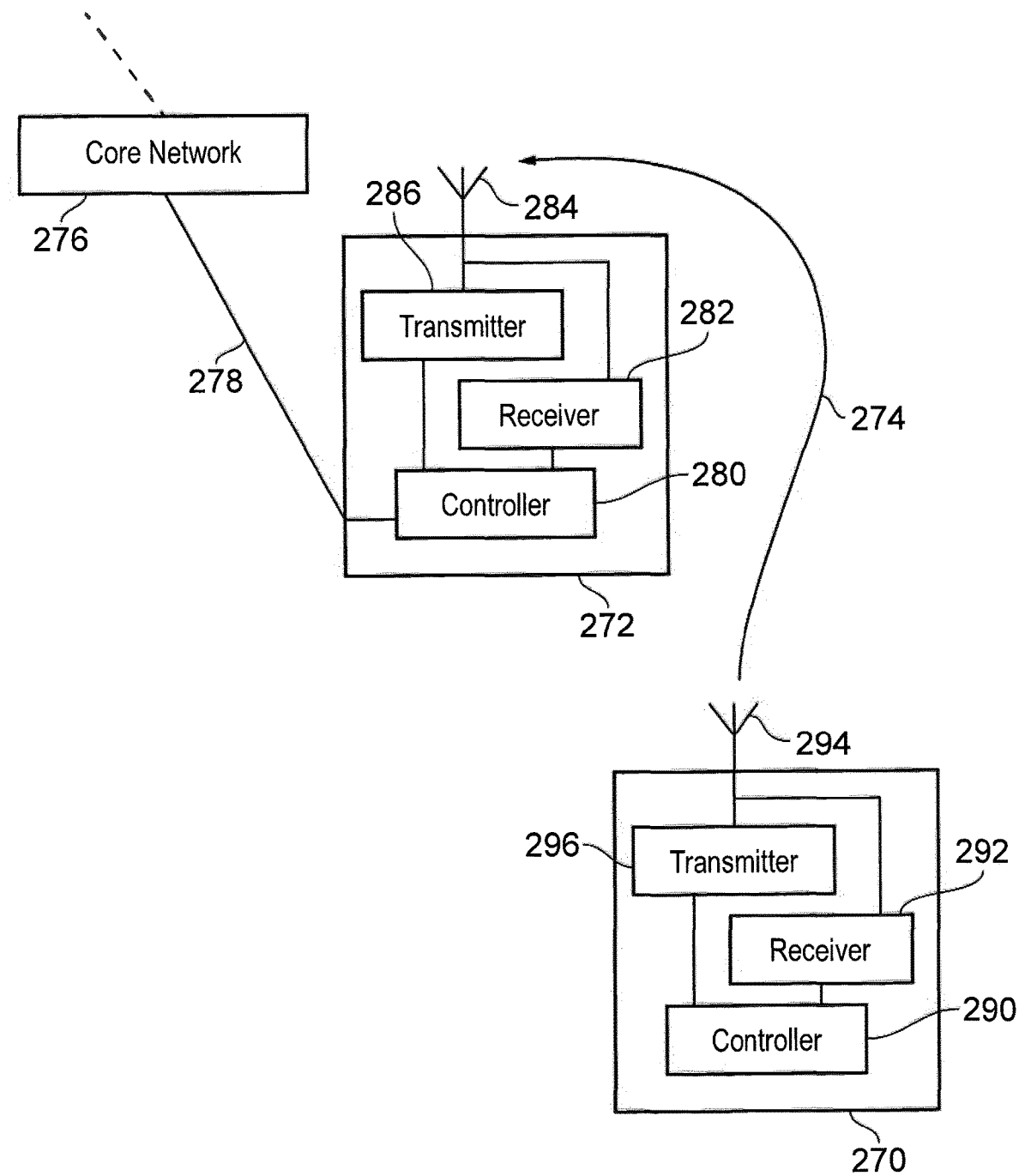
FIG. 3 is a schematic block diagram of an example infrastructure equipment and communications device configured in accordance with example embodiments.

A more detailed illustration of a UE 270 and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via grant free resources of a wireless access interface as illustrated generally by an arrow 274. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 101 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 104 will in general comprise various other elements associated with its operating functionality, for example a power source, user interface, and so forth, but these are not shown in FIG. 3 in the interests of simplicity.

Example embodiments described below can find application with advanced wireless communications systems such as those referred to as 5G or New Radio (NR) Access Technology. The use cases that are considered for NR include:
  Enhanced Mobile Broadband (eMBB)
  Massive Machine Type Communications (mMTC)
  Ultra Reliable & Low Latency Communications (URLLC) [2]

eMBB services are characterised by high capacity with a requirement to support up to 20 Gb/s. The requirement for URLLC is a reliability of $1-10^{-5}$ (99.999%) for one transmission of a 32 byte packet with a user plane latency of 1 ms [3]. Embodiments can find application particularly to URLLC, which has recently been proposed within 3GPP for 4G and 5G communications networks. In some examples, URLLC communications are either low latency (where the user plane latency target is 1 ms) or high reliability (where the acceptable error rate on URLLC transmissions is $10^{-5}$) or both low latency and high reliability (where both the latency and reliability targets need to be met at the same time).

Figure 16:
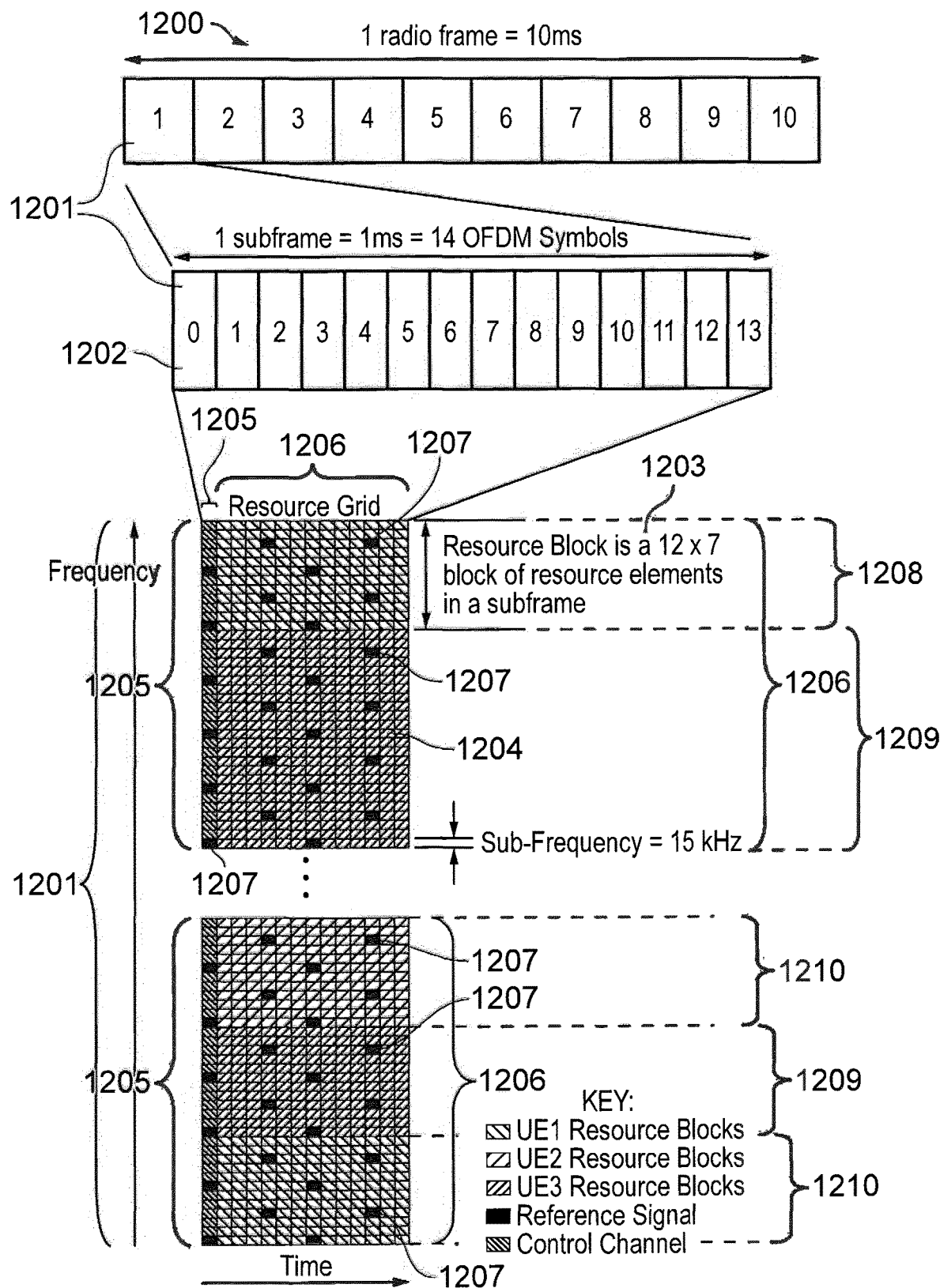
FIG. 16 is a schematic representation of a downlink of a wireless access interface according to the 3GPP LTE standard.
Figure 17:
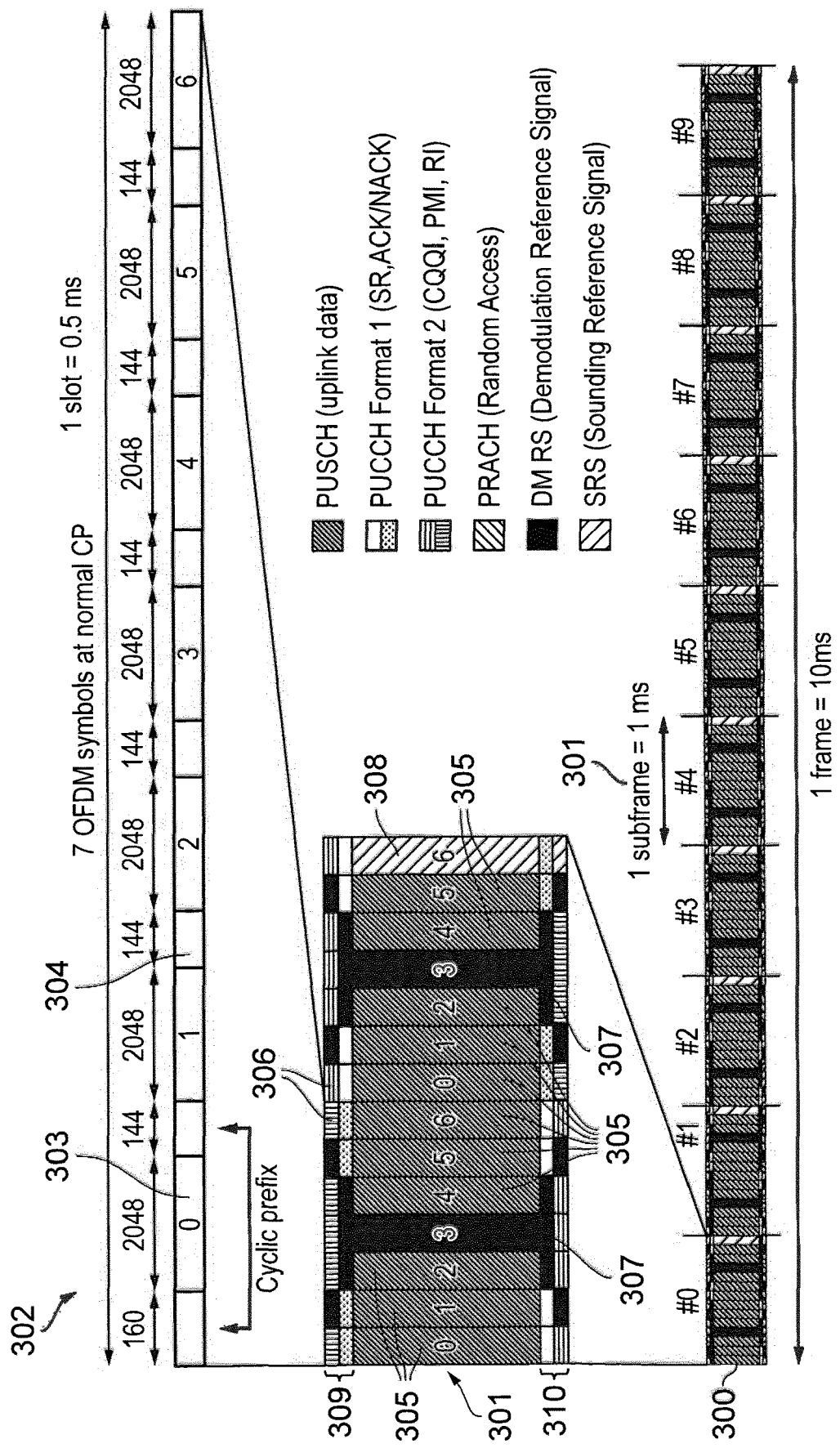
FIG. 17 is a schematic representation of an uplink of a wireless access interface according to the 3GPP LTE standard.

Embodiments described below provide a more efficient arrangement for communicating uplink data via grant free resources of an uplink of the wireless access interface. This is because a timing structure of the uplink grant free resources may not match a timing with which the uplink data is encoded for transmission. A better appreciation provided by the example embodiments can be gained from reviewing a proposed wireless access interface according to 3GPP LTE/4G and NR/5G. A wireless access interface in accordance with a 3GPP Standard for LTE is described in detail in Annex 1 in which FIGS. 16 and 17 provide detailed representation of a wireless access interface for the downlink and the uplink respectively. More details of the LTE wireless access interface are therefore described in Annex 1. However it will be appreciated that the wireless access interface provides physical communications resources including shared channels for both uplink and the downlink which may be accessed by communicating appropriate control signalling as those acquainted with LTE will appreciate. Equally a wireless access interface for the 5G Standard as represented in FIG. 2 may be similarly formed in accordance with the arrangement shown in Annex 1 and may use OFDM on the downlink and OFDM or SC-FDMA on the uplink.

Figure 4:
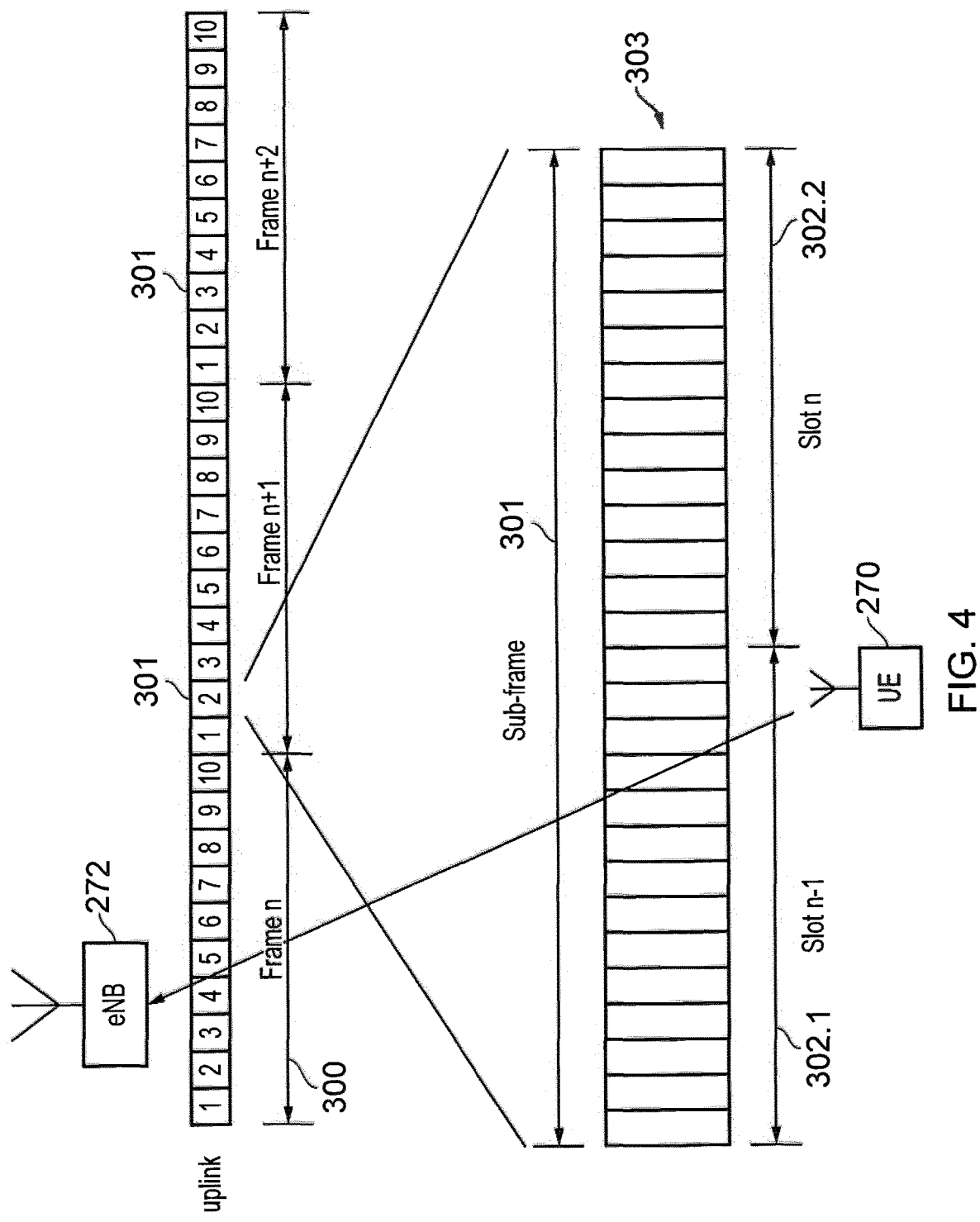
FIG. 4 is a schematic illustration of a simplified representation of an uplink of the wireless access interface shown in FIG. 17 illustrating a frame, sub-frame and slot structure of time divided units of the wireless access interface.

FIG. 4 provides a simplified representation of an uplink frame/sub-frame structure based on the NR wireless access interface structure. In FIG. 4 a simplified version of the uplink frame/sub-frame structure is provided in order to assist in the explanation of the example embodiments. As shown in FIG. 4, the uplink of the wireless access interface is shown to comprise frames 300 with respect to which the UE 270 transmits uplink data to the infrastructure equipment 272. Consistent with the explanation provided in Annex 1, the uplink comprises in each frame 300 ten sub-frames 301. A frame 300 is defined by 10 ms, a sub-frame 301 is defined by 1 ms, and a slot 302 is defined by fourteen OFDM symbols, irrespective of subcarrier spacing. In FIG. 4, 30 kHz subcarrier spacing is assumed. An expanded view of the components of a sub-frame 310 are shown to be formed from two consecutive slots n−1, n 302, include physical resources of a shared channel as well as control channels as explained in Annex 1 with reference to FIG. 15. As explained in the following section, although access by UEs to the shared resources of the uplink channel by request and grant from the infrastructure equipment, embodiments of the present technique find application with grant free access to the resources of the uplink shared channel (PUSCH). As such transmission of a URLLC message by a UE 270 can be done more quickly incurring a shorter delay.

Improvement in or Relating to Uplink Communication Using Grant Free Resources

One aspect of a NR or 5G wireless access interface as controlled for example a the controller 272 of the infrastructure equipment 272 is the provision of grant free access to communications resources for transmitting uplink data. In a conventional uplink transmission, when data arrives from upper protocol layers at a buffer at the medium access control (MAC) protocol layer of the communications device, the communications device may transmit, in response, a Scheduling Request (SR) to the network. The SR may comprise a buffer status report (BSR), indicating an amount of data in the MAC layer buffer(s). In response to receiving the SR, the network (for example, the infrastructure equipment) may send an Uplink Grant carried by downlink control information (DCI) to the communications device. The DCI may be transmitted on a physical downlink control channel (PDCCH).

The uplink grant may comprise an indication of uplink communications resources which are allocated (or, in other words, scheduled) for the communications device to transmit its uplink data. The uplink communications resources may be on a physical uplink shared channel (PUSCH). This type of resource allocation is known as grant based resource. Grant based resources are suitable for services where the data arrives in variable amounts, and/or is aperiodic, even if such the data traffic arrival follows a somewhat predictable traffic pattern.

On the other hand, grant free resources are a set of periodically repeating uplink communications resources which are semi-statically configured by the network for the use of the communications device for uplink transmission. Grant free resources allocation is particularly suitable for services that generate periodic data traffic, where the amount generated is broadly constant over time.

Figure 5:
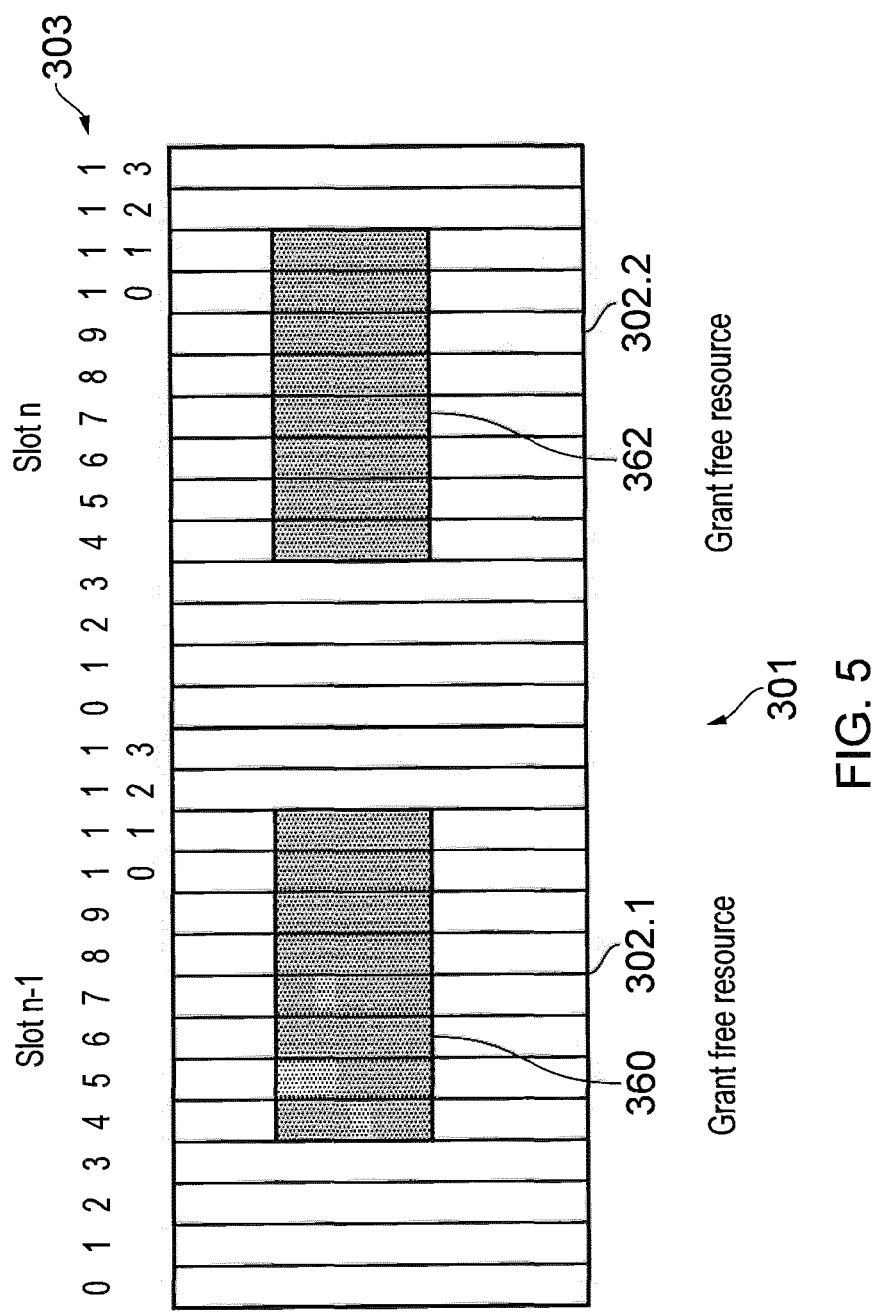
FIG. 5 is an illustration of the uplink of the wireless access interface shown in FIG. 4 adapted to include communications resources configured for grant free access by communications devices.

The grant free resources can improve the efficiency with which communications resources are used, since there is no need for either a SR or uplink grant to be transmitted in respect of each uplink data transmission. An illustration of grant free resources for communicating uplink data is shown in FIG. 5 based on the frame/sub-frame/slot structure illustrated in FIG. 4. As shown in FIG. 5, the two slots n−1, n 302.1, 302.2, which each comprise fourteen OFDM symbols 303 are shown to include a section of grant free resources in each slot 360, 362 from OFDM symbol numbered 4 to 11.

An explanation of a technical problem addressed by the example embodiments can be appreciated by considering a timing structure of an uplink of a wireless access interface proposed for NR. As illustrated in FIG. 5, the grant free resources are provided in the uplink in a temporal section of each slot. However if the generation and encoding of transport blocks into data units does not match a timing of the grant free resources then a coding or transmission scheme may be compromised or the resources used in efficiently. A better understanding of a timing of an encoding of transport blocks into encoded data units for transmission may be appreciated from a more detailed example of the transmitter 296 and the receiver 292 of the UE 270 which is provided in FIGS. 6 and 7.

Figure 6:
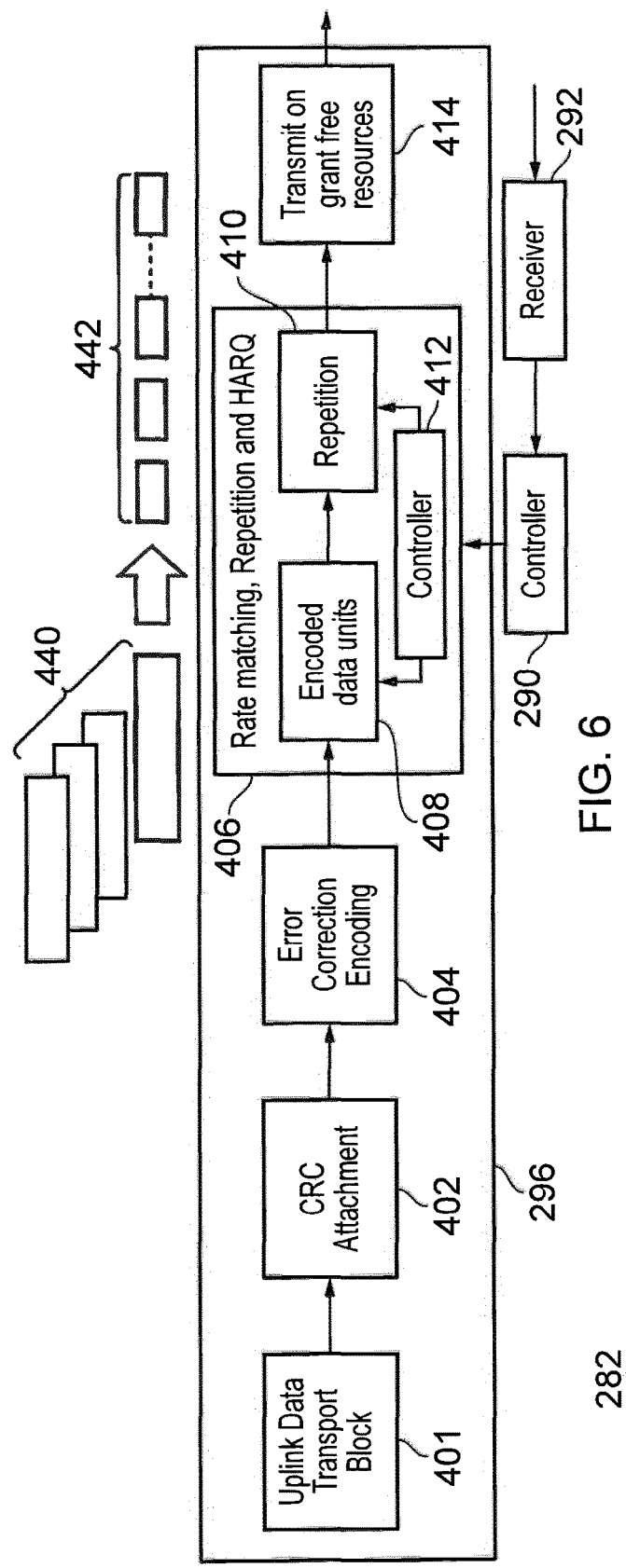
FIG. 6 is a schematic block diagram of an example transmitter (also showing a receiver and a controller of a communications device) configured to transmit uplink data using uplink grant free resources illustrated in FIG. 5.

As shown in FIG. 6, uplink data for transmission is formed into transport blocks by for example a medium access control layer and passed to a physical layer for transmission by an uplink data transport block 401. The uplink transport blocks are then fed to a CRC Attachment block 402, which calculates a cyclic redundancy check (CRC) on each transport data block before passing the combined CRC parity check bits and data bits representing to an error correction encoder 404. The error correction encoder encodes the CRC and the data bits of the transport blocks to form error correction encoded transport blocks 440 for transmission on the grant free resources 360, 363. The error correction encoded transport blocks are then received by a rate matching, repetition and hybrid automatic repeat request (HARQ) block 406 which includes an encoded data unit former 408 and a repetition block 410. The rate matching, repetition and HARQ block 406 is controlled by a controller 412 to generate encoded data units 442 for transmission by a transmission block 414 on the uplink grant free resources.

Figure 7:
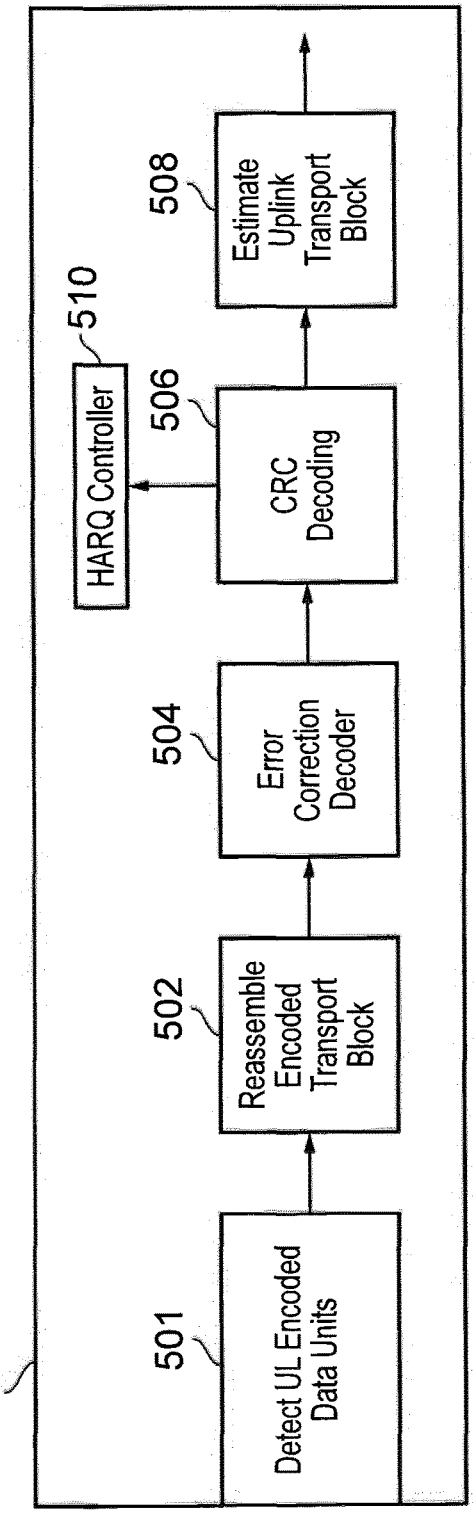
FIG. 7 is a schematic block diagram of an example receiver configured to receive uplink data transmitted via the uplink grant free resources illustrated in FIG. 5.

A schematic block diagram of the receiver 282 of the infrastructure equipment 272 for detecting radio signals transmitted from the UE 270 in the grant free resources and for decoding the encoded transport block represent by the radio signals is shown in FIG. 7. As shown in FIG. 7 a detection block 501 detects the encoded units of data transmitted uplink grant free resources 360, 363 from the UE 270. As explained below the encoded data units making up each encoded transport block may be transmitted using a HARQ scheme and a repetition scheme in which the same encoded data unit is transmitted repeatedly in the uplink grant free resources. Therefore after detecting the encoded data units, a reassemble encoded transport block element 502 reassembles the encoded transport blocks from the encoded data units and feeds the encoded transport blocks to an error correction decoder 504. The reassemble block 502 may combine the repeated receptions of the encoded data units by soft-combining to reassemble the transport blocks, where soft-combination can comprise addition of log-likelihood ratios (LLRs) for received soft bits of the repetitions. The error correction decoder 504 decodes the encoded transport block and generates an estimate of the data in accordance with the error correction encoding scheme being used at the transmitter. A CRC decoder 506 performs CRC in accordance with a conventional arrangement to detect whether the uplink data in the transport block has been correctly received which outputs to the uplink data to a processing block 508.

Figure 8:
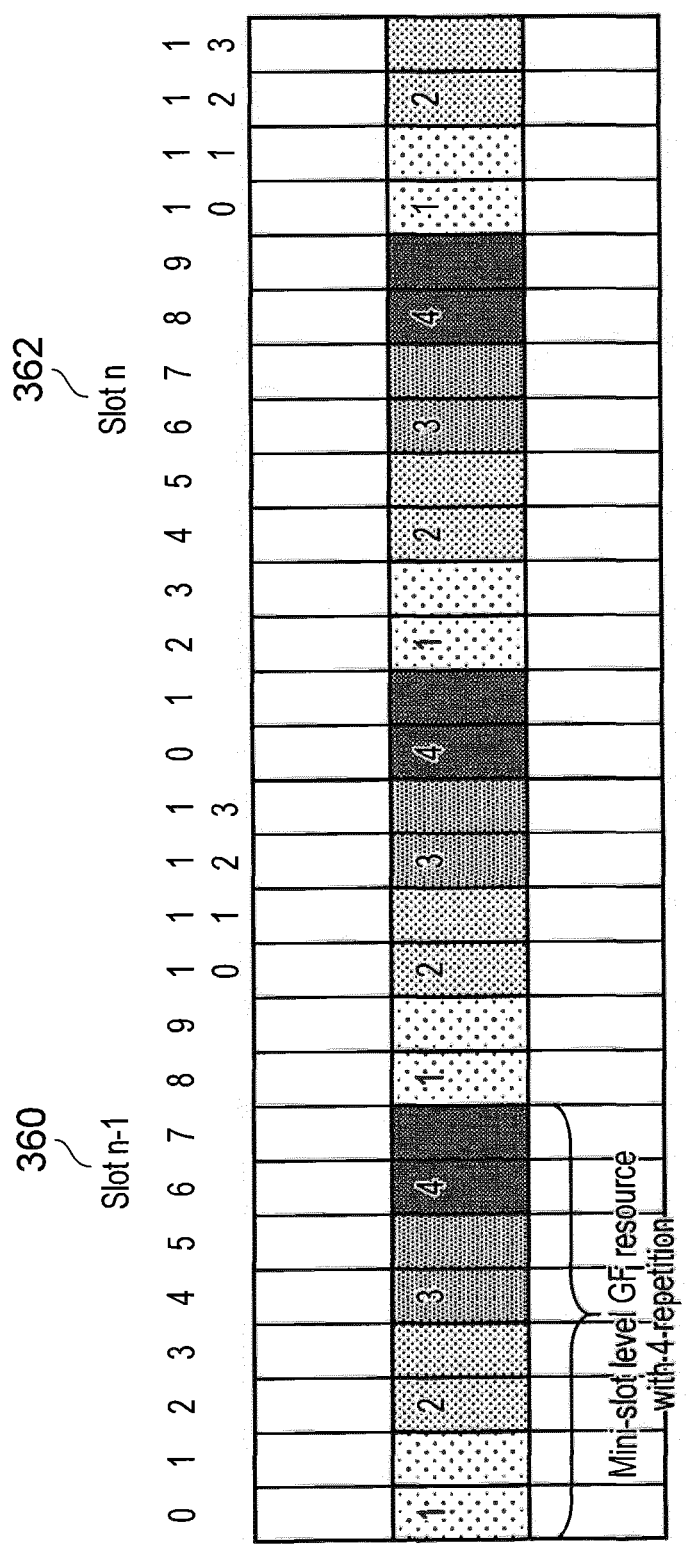
FIG. 8 is an illustration of the uplink of the wireless access interface shown in FIG. 4 adapted to include communications resources configured for grant free access by communications devices in which each of the time divided slots is divided into two mini-slots and encoded data units are transmitted repeatedly in a transmission period of the mini-slot.
Figure 8:
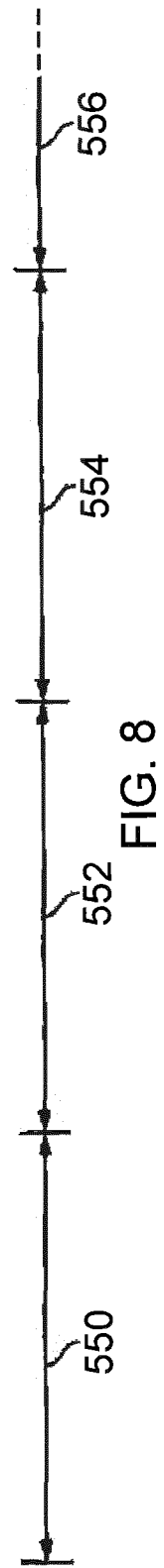

As indicated above, the encoded transport blocks 440 may be transmitted via the grant free uplink resources using a HARQ scheme combined with repeated transmission. As such the rate matching, repetition and HARQ block 406, may divide the encoded transport blocks 440 into encoded data units 442 for transmission via the grant free resources of the uplink. In order to match a capacity of the uplink grant free resources, the encoded data units may be rate matched by puncturing the bits, for example where each encoded data unit 442 is to be transmitted one or more of the OFDM symbols in the slot 360, 362. Furthermore each encoded data unit may be transmitted according to a HARQ process in which the HARQ process gives each encoded data unit 442 a HARQ identifier. Furthermore in order for a HARQ controller 510 in the receiver 282 to perform the HARQ process match to the transmitter the HARQ identifier may be matched to the slot or sub-frame number rather than a time of generating each data unit in the transmitter 296. Finally, the rate matching, repetition and HARQ block 406 may transmit each of the encoded data unit a repeated number of times in order to improve integrity of the communicated uplink data by improving a likelihood that the uplink data is received correctly. For example it has been proposed for 3GPP release-16 to perform repeated transmission based on a mini-slot structure. FIG. 8 provides an example in which an encoded data unit 442 is transmitted four times in each mini-slot, which is eight OFDM symbols of the slot 360, 362, so that each of the slots 360, 363 is divided in half to form the mini-slots 550, 552, 554, 556.

<<Problem and Solution>>

Figure 9:
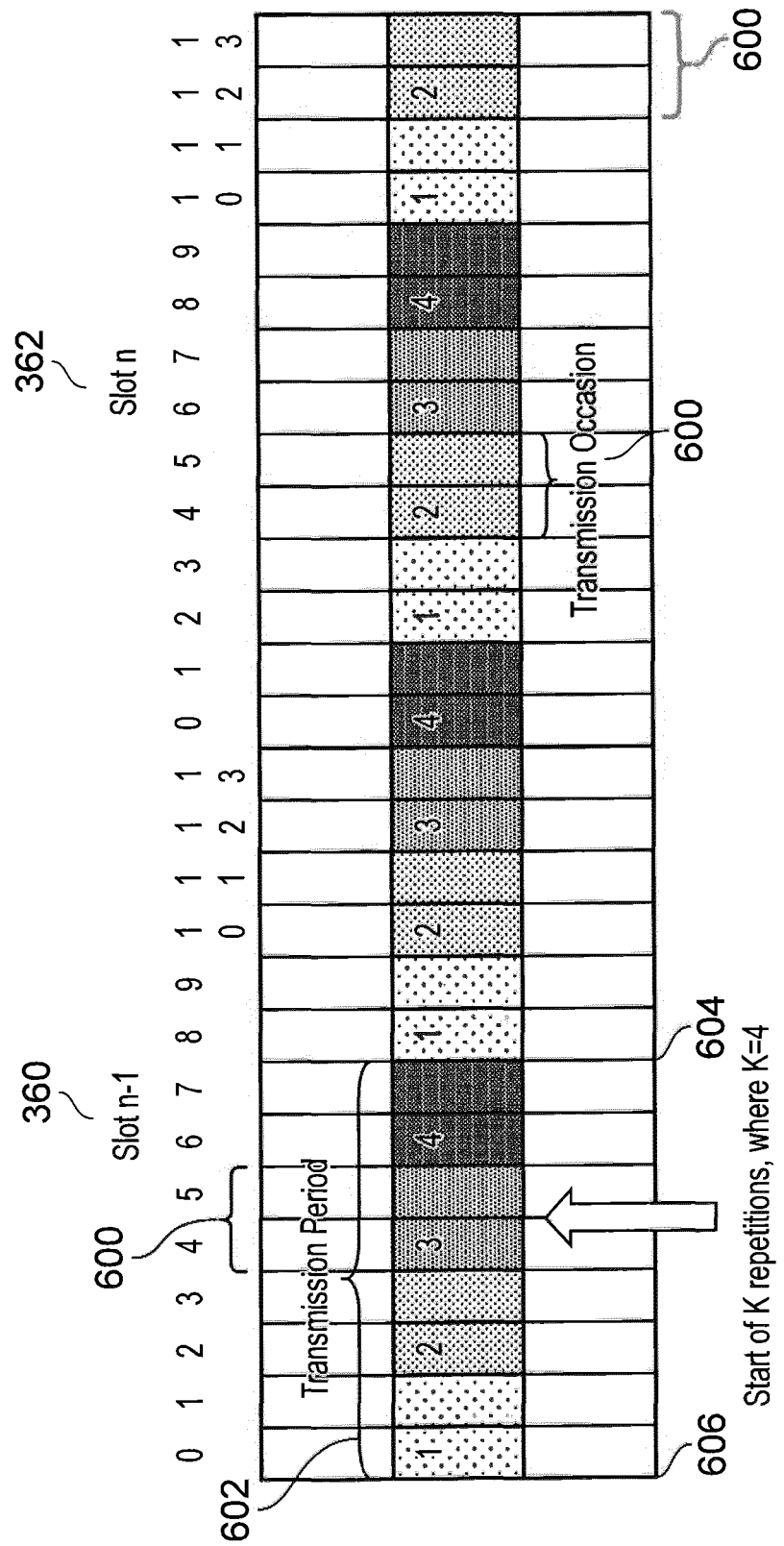
FIG. 9 is an illustration of the grant free uplink of a wireless access interface in which the grant free resources are used to transmit encoded data units in transmission occasions repeatedly to form a transmission period and showing a miss-alignment of a start of the repetitions with respect to the transmission period.

As will be appreciated from the above explanation, previously proposed arrangements for uplink grant free transmission for example in the PUSCH (3GPP Release 15) can include transmitting K repetitions of encoded data units, where each encoded data unit 442 is transmitted in a transmission occasion, which may be for example a slot 360, 362. These K repetitions are transmitted over multiple transmission occasions (TO) where several TO form a transmission period for transmitting each encoded data unit. The TO implicitly indicates to the receiver 282 in the infrastructure equipment 272 a version of the encoded data unit, which can be referred to as a Redundancy Version whilst the transmission period implicitly indicates to the receiver 282 the HARQ process identifier. If the transmission does not start at the beginning of a transmission period as interpreted at the receiver 282, the transmitter 296 of the UE 270 may not be able to transmit K repetitions since it may reach the end of the transmission period and hence a change in HARQ process identifier before the K repetitions have been transmitted. An example is shown in FIG. 9 where the start of a K=4 PUSCH repetition starts at the third TO 600 (OFDM symbol 4 and 5 of Slot n−1 360) of a transmission period 602, which should allow K=4 repetitions of the encoded data unit, but because of the timing of transmission only two repetitions can be made before the transmission period ends at 604. Essentially this is because a timing of the grant free resources as well as an implicit timing of transmission of encoded data units is made with respect to the timing structure of the uplink so that the receiver may know the timing of the transmissions, but this may not match a timing of the generation of the uplink data for transmission.

If the pre-defined K repetition have to be ensured to provide a desired reliability and integrity of communication, transmission should be started from a first TO 606 of a transmission period 602. Therefore a starting opportunity of the repeated transmission of an encoded data unit depends on the number of repetition K. A frequency of the starting opportunity affects the latency with which the encoded data unit 442 and therefore the transport block 440 is transmitted. For a small number of repetitions, the frequency of the starting opportunity is increased, thereby providing s lower latency but the reduced number of repetition will reduce the communication reliability. In the case of a large number of repetitions, a communication reliability is increased but the frequency of the starting opportunity for transmitting the encoded data unit is reduced thereby increasing the latency of transmission.

Figure 10:
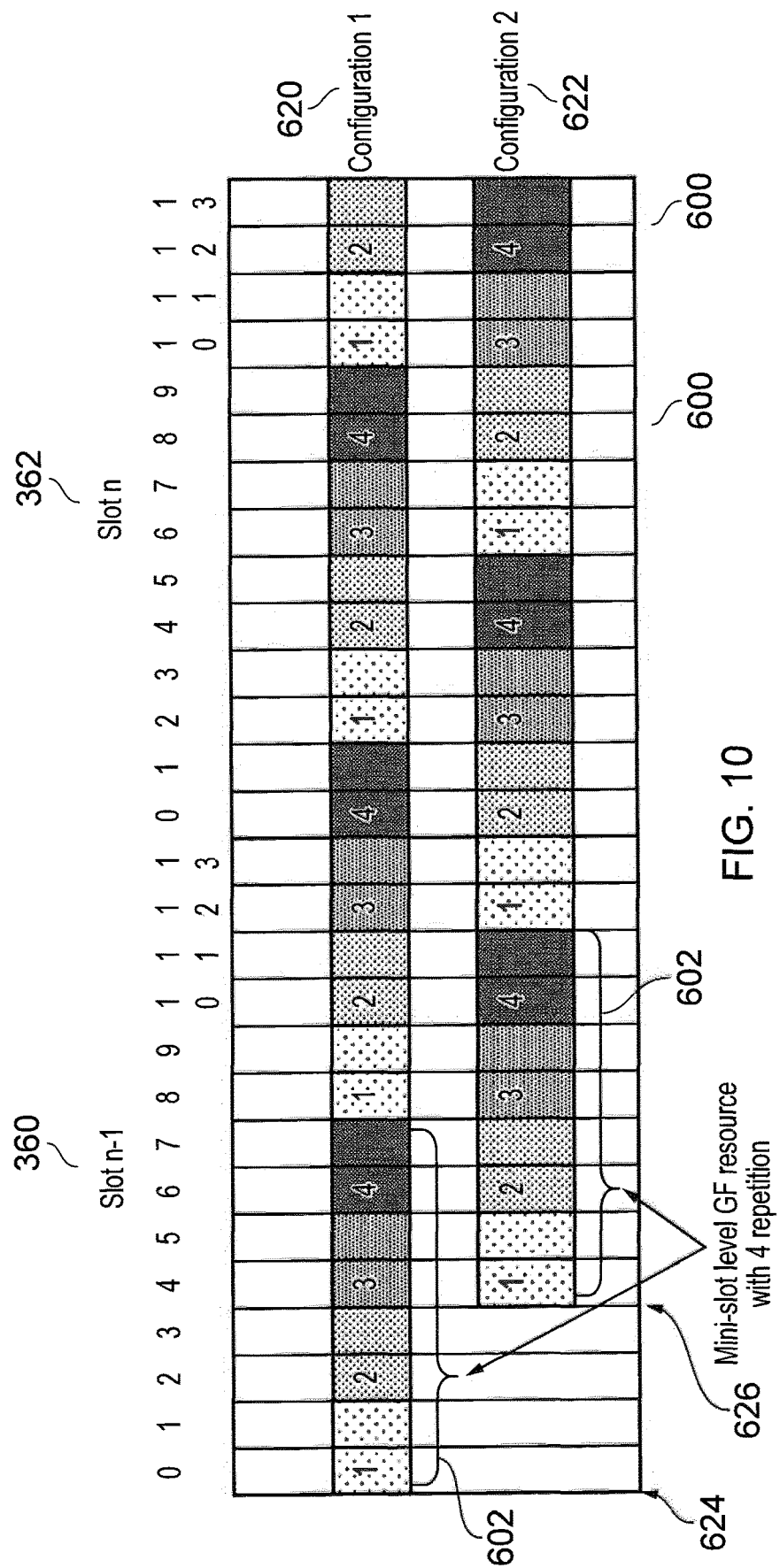
FIG. 10 is another example illustration of the grant free uplink of a wireless access interface in which the grant free resources are used to transmit encoded data units in transmission occasions repeatedly to form a transmission period and showing two example configurations staggered in time to reduce a latency of transmitting uplink data.

As described previous, a URLLC PUSCH that starts in the middle of a transmission period may not have sufficient transmission occasions to complete the targeted K repetitions of a transmission period. One proposal is to have multiple grant free configurations where in each of this GF resource the transmission period starts at a different time [4], i.e. staggered in time. For example in FIG. 10 two configurations 620, 622 of grant free resources is shown where Configuration 1 620 starts its transmission period at the beginning of Slot n−1 624 whilst Configuration 2 622 starts at the OFDM symbol #4 626 which is therefore staggered in time. Hence if a URLLC PUSCH with K=4 arrives in the middle of a transmission period of Configuration 1, e.g. at OFDM symbol #4 626, then instead of using Configuration 1 620 thereby giving only two repetitions, it can use Configuration 2 622 which can provide four TOs 600 for four repetitions.

Embodiments of the present technique can provide an improvement in accessing grant free resources. In particular, embodiments of the present technique can provide:

Multiple configuration of grant free transmissions to support more than one data with different priority and/or different requirement for URLLC UE behaviour in the case of a collision between more than one data with different priority and/or different requirement for URLLC when multiple configurations are configured UE behaviour in the case of overlapped grant free resources in frequency domain among different configurations Multiple Configurations Embodiments of the present technique can provide an arrangement in which the UE 296 is configured to transmit data to a wireless communications network by processing uplink data for transmission on the grant free resources of the uplink to form one or more transport block of the uplink data, the grant free resources providing communications resources in each of a plurality of time divided units of the wireless access interface for transmitting the uplink data, such as the time slots 360, 362 or the mini-slots 550, 552, 554, 556. The method includes selecting one of a plurality of configurations for transmitting the uplink data in the grant free resources, and transmitting the one or more transport blocks in the grant free resources according to the selected configuration. Each of the plurality of configuration includes a transmission period for transmitting the one or more transport blocks in the time divided units of the wireless access interface, the temporal starting position and the transmission period, the transmission period and the starting position of the transmission period are independently set for each of the plurality of configurations and may therefore be different for each of the plurality of configurations.

As will be understood from the example transmitter 296 and the receiver 282 illustrated in FIGS. 6 and 7 above, in some example embodiments the processing of the uplink data for transmission includes forming the uplink data into the uplink transport blocks for transmission, encoding each of the uplink transport blocks to encoded transport blocks, forming from each of the encoded transport blocks a plurality of encoded data units, each of the encoded data units being formed for repeated transmission in each of a plurality of transmission occasions forming each of the transmission periods in communications resources of the uplink grant free resources. Each of the plurality of configurations therefore includes a number of repetitions for transmitting the encoded data units which is different for each configuration, providing for each configuration a different transmission period.

Example embodiments can therefore provide a plurality of configurations of the transmitter on the UE and receiver in the infrastructure equipment for using grant free resources for transmitting uplink data from different sources having different quality of service requirements and therefore different priorities and/or different requirements for URLLC. To support more than one data with different priority and/or different requirement for URLLC, the multiple configuration for grant free transmission can have different parameters. For example, the following parameters are independently configured for each configuration for grant free transmission:

Number of repetitions of encoded data units

Figure 11:
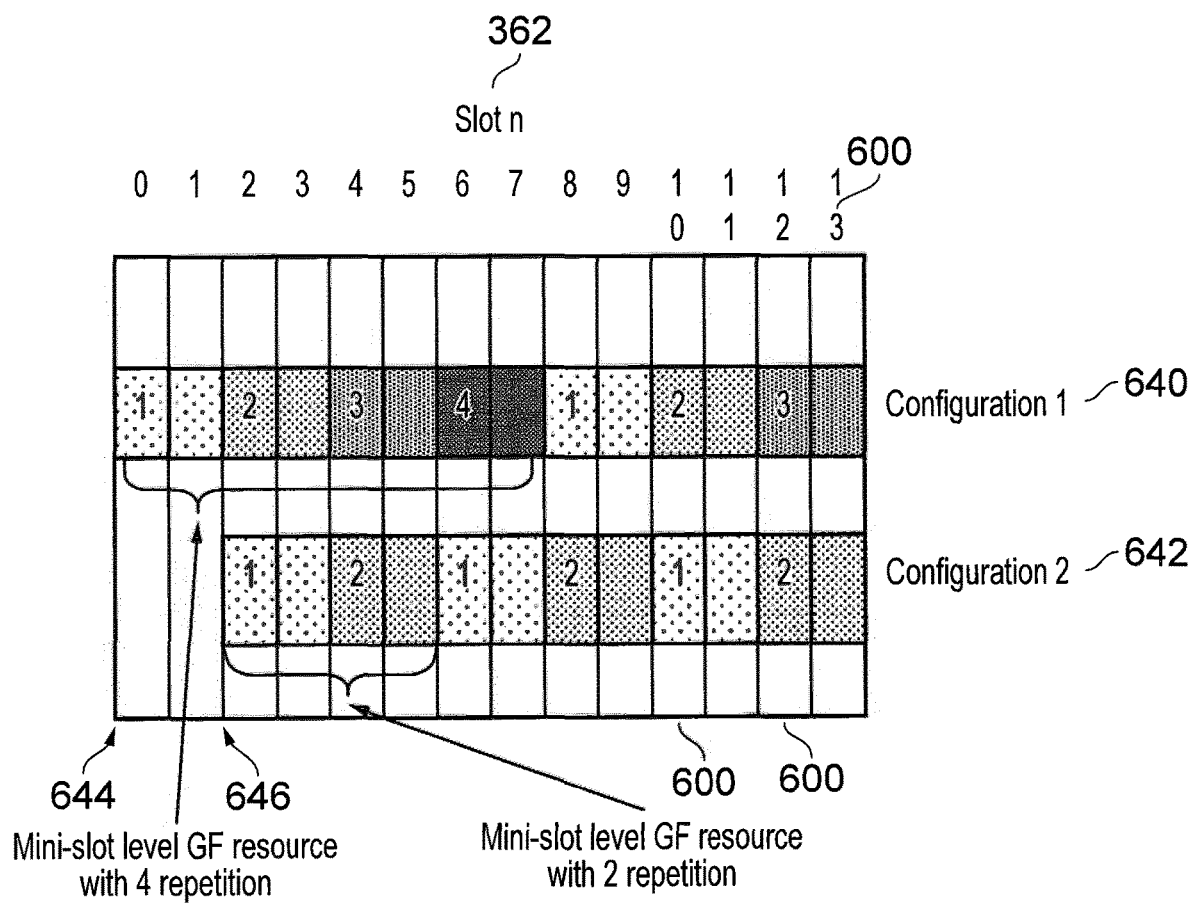
FIG. 11 is another example illustration of the grant free uplink of a wireless access interface in which the grant free resources are used to transmit encoded data units in transmission occasions repeatedly to form a transmission period for two example configurations staggered in time to reduce a latency of transmitting uplink data and for a different number of repetitions.

The number of repetitions of the encoded data units 440 can be different among different configurations for grant free transmission as shown in FIG. 11. As shown in FIG. 11, two configurations are shown 640, 642 for configuration 1 and configuration 2, which also have different start times 644, 646 with the slot 362.

For the example shown in FIG. 11, the configuration 1 640 can be used for a data with relatively high reliability and the configuration 2 642 can be used for a data with relatively low latency.

Modulation and coding scheme (MCS)

The MCS can be different among configurations for grant free transmissions.

For example, a configuration with low MCS can be used for a data with relatively high reliability and a configuration with high MCS can be used for a data with relatively high bit-rate (large capacity). A low MCS can be for example a modulation scheme with a small number of constellation points whereas error correction encoding can be with a low rate providing a relatively high amount of redundancy.

Bandwidth of GF resource

The bandwidth of the grant free resources can be different among different configurations of grant free transmissions.

For example, a configuration with large bandwidth can be used for a data with relatively high bit-rate (large capacity) and a configuration with narrow bandwidth can be used for a data with relatively low bit-rate (small capacity).

For example, a configuration with large bandwidth or narrow bandwidth can be determined depending on a distance (pathloss) between the infrastructure equipment and the UE. When the distance is long, the UE will transmit a data with high uplink power. However the maximum uplink power is defined by regulation. In some examples the UE may not be permitted to increase the transmission power beyond a specified limit (power limited). If the UE has reached its power limit then it can use s configuration with a narrow bandwidth.

For example, a configuration with large bandwidth or narrow bandwidth can be determined based on a propagation channel condition. A configuration with large bandwidth can be used to decrease a channel coding rate for the uplink data when a propagation channel condition is worse. A configuration with narrow bandwidth can be used to increase a channel coding rate for the uplink data when a propagation channel condition is better.

PUSCH DMRS configuration

Each configuration can have different demodulation reference sequence density and pattern The location the DMRS symbols can be different for different configurations This allows the grant free resources from different configurations to overlap (partially or fully) in frequency and be distinguished by the DMRS configuration of the PUSCH Transmission parameter associated with reception at the infrastructure equipment (gNB)

The transmission parameter associated with gNB can be a beam pattern, a transmission power and/or timing advance.

For example, the transmission parameter A and B are suitable for transmission to gNB A and B, respectively.

The transmission parameter associated with gNB can be different among configurations of grant free transmissions.

For example, a configuration with transmission parameter A can be used when data is transmitted to gNB A (where the transmission parameter A is associated with gNB A) and a configuration with transmission parameter B can be used when a data is transmitted to gNB B (where the transmission parameter B is associated with gNB B).

Prioritisation of Data from Different Sources Using Different Configurations for Different Priority and/or Different Requirement for URLLC As will be appreciated from the above explanation, with a plurality of configurations for transmitting in the grant free resources, there is a possibility that different services may require access to the grant free resources from the same UE. According to example embodiments therefore, data to be transmitted for different services from different sources may each have a different configuration and the data from each of the services/sources may have a different relative transmission priority for accessing the grant free resources from the UE. The UE may therefore transmit data from different sources but prioritise the transmission of the data which may be transmitted according to the different configurations. For example, if a UE is configured with two configurations for using the grant free resources, each configuration having a different starting position (OFDM symbol) for the repeated transmission of the encoded data unit, one can be prioritised with respect to the other according to a relative priority of each service type/source. When the uplink data with a higher priority is required to be transmitted during transmission of different uplink data with a lower priority, the uplink data with the higher priority can be prioritized. That is to say multiple grant free resources configurations are associated with a different priority and accordingly transmission on the grant free resources is given a priority such that the higher priority grant free resources can pre-empt a lower priority grant free resources within the same UE. The following are examples for prioritising access to the grant free resources for different configurations having different priority:

Stopping the uplink data with low priority:

If more than one uplink data transmission will cause a collision with transmission of uplink data from a different source in the grant free resources, uplink data with a higher priority is transmitted instead of the uplink data with the lower priority. In other words, uplink data with the lower priority is stopped and the uplink data with the higher priority is transmitted on the grant free resources.

Figure 12:
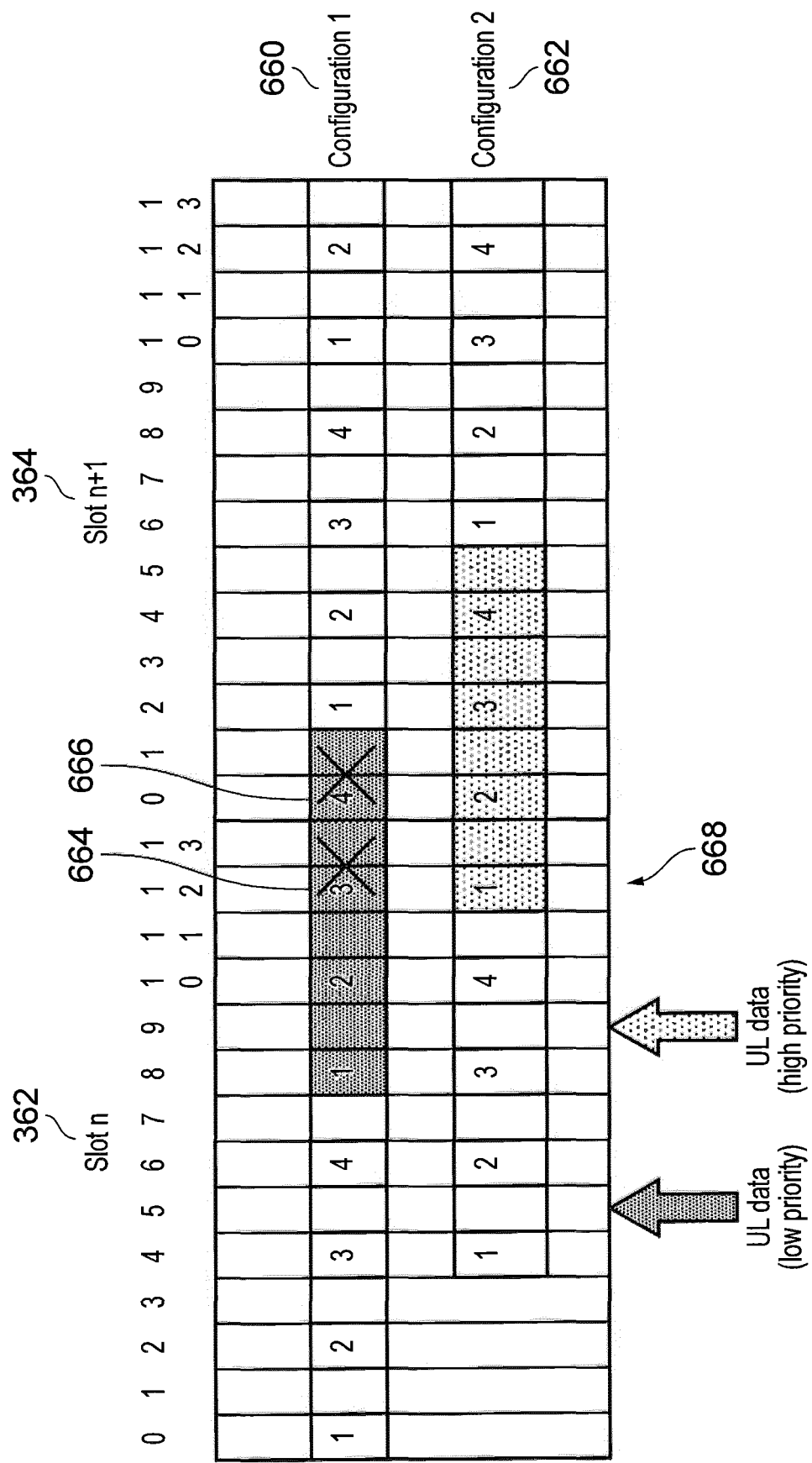
FIG. 12 is another example illustration of the grant free uplink of a wireless access interface in which the grant free resources are used to transmit encoded data units in transmission occasions repeatedly to form a transmission period for two example configurations staggered in time in which the transmitting of the uplink data units for one of the configurations is adapted in accordance with a relative priority of the uplink data compared with the other configuration.

For example as shown in the FIG. 12 uplink data from a first source is configured with a first configuration 1 660, whereas uplink data from a different source is configured for transmission with a different configuration 2 662. In this example, the second configuration 2 662 carries data with a higher priority than the first configuration 1 660. As shown in FIG. 12, the encoded data unit for the third and fourth repetition 664, 666 (i.e. symbol 12 and 13 in slot n, and symbol 0 and 1 in slot n+1) is not transmitted. Instead the uplink data from the second source with configuration 2 662 begins at position 668, because it has a higher priority.

If a UE determines that it should stop a transmission of a uplink data with lower priority, then the UE can inform the infrastructure equipment (gNB) of the prioritized transmission. The indication can be performed on grant free resources of configuration 1 660. In addition, the UE can indicate which grant free resources is used.

Postponing the uplink data with low priority:

For the example illustrated in FIG. 12, the collision of the uplink data transmitted in the uplink grant free resources from the first source according to the first configuration 1 660 will conflict with the transmission of uplink data from the second source using the configuration 2 662 having a higher priority. For the example above the transmission of the lower priority using configuration 1 660 is stopped. However according to a different example the transmission of the uplink data from the first source with the first configuration 1 660 can be postponed until the transmission of the uplink data with the higher priority according to configuration 2 662 has ended at point 670. In other words, after the transmission of the uplink data with high priority is finished, the transmission of the uplink data with low priority is resumed.

Figure 13:
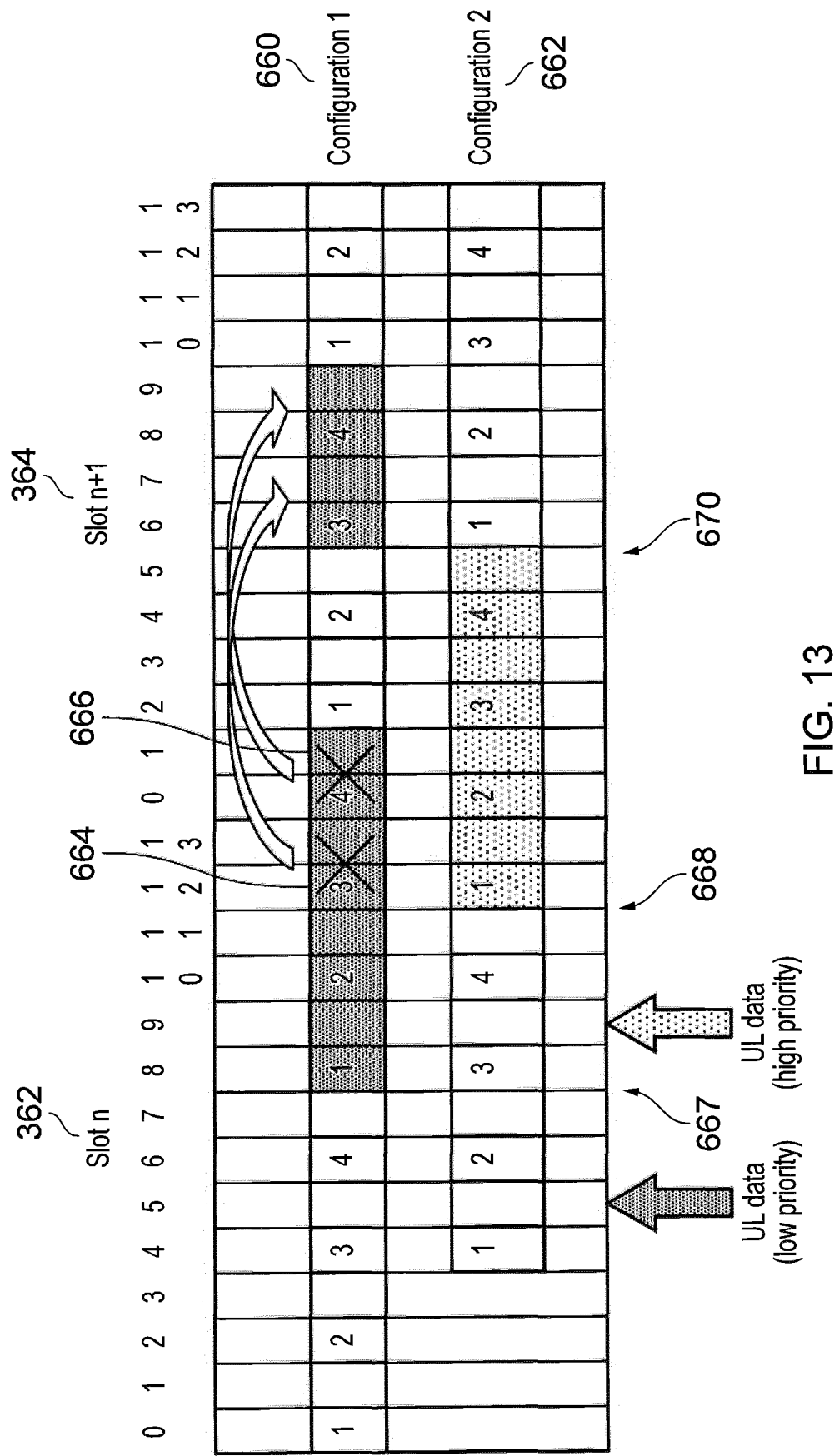
FIG. 13 is an example illustration of the example shown in FIG. 12 in which the transmitting of the uplink data according to one of the configurations includes postponing the transmission.

For example as shown FIG. 13, on repetition 3 and 4 (i.e. symbol 12 and 13 in slot n, and symbol 0 and 1 in slot n+1) of the uplink data transmission of the first configuration 1 660, the uplink data with lower priority is not transmitted in grant free resources and the uplink data with the higher priority is transmitted in the grant free resources of the second configuration 2 662 transmitted from point 668. However the stopped transmission is resumed on repetition 3 and 4 (i.e. symbol 6 to 9 in slot n+1) from the first source using the first configuration 660 after the pint 670 when the transmission from the second source using the higher priority configuration 2 662 has finished.

If the UE 270 determines that the transmission from the first source with the first configuration 1 660 has been stopped at the point 668, it can inform the infrastructure equipment 272 (gNB) of the prioritized transmission of the uplink data from the second source with the higher priority of configuration 2 662. The UE 270 can inform the infrastructure equipment 272 by transmitting an indication on the grant free resources of configuration 1. In addition, the UE can indicate which grant free resources are to be used. In addition, the UE 270 can inform the infrastructure equipment whether the stopped transmission is resumed in grant free resources of the first configuration 1 660 or a new transmission is performed in the grant free resources according to the second configuration 2 662.

Multiplexing the higher priority uplink data with lower priority uplink data

As an alternative to the above examples in which the collision of the uplink data transmitted in the uplink grant free resources from a source according to the first configuration 1 660 will conflict with the transmission of uplink data from a different source using the configuration 2 662 having a higher priority, the uplink data from different source can be multiplexed in the same grant free resources.

Figure 14:
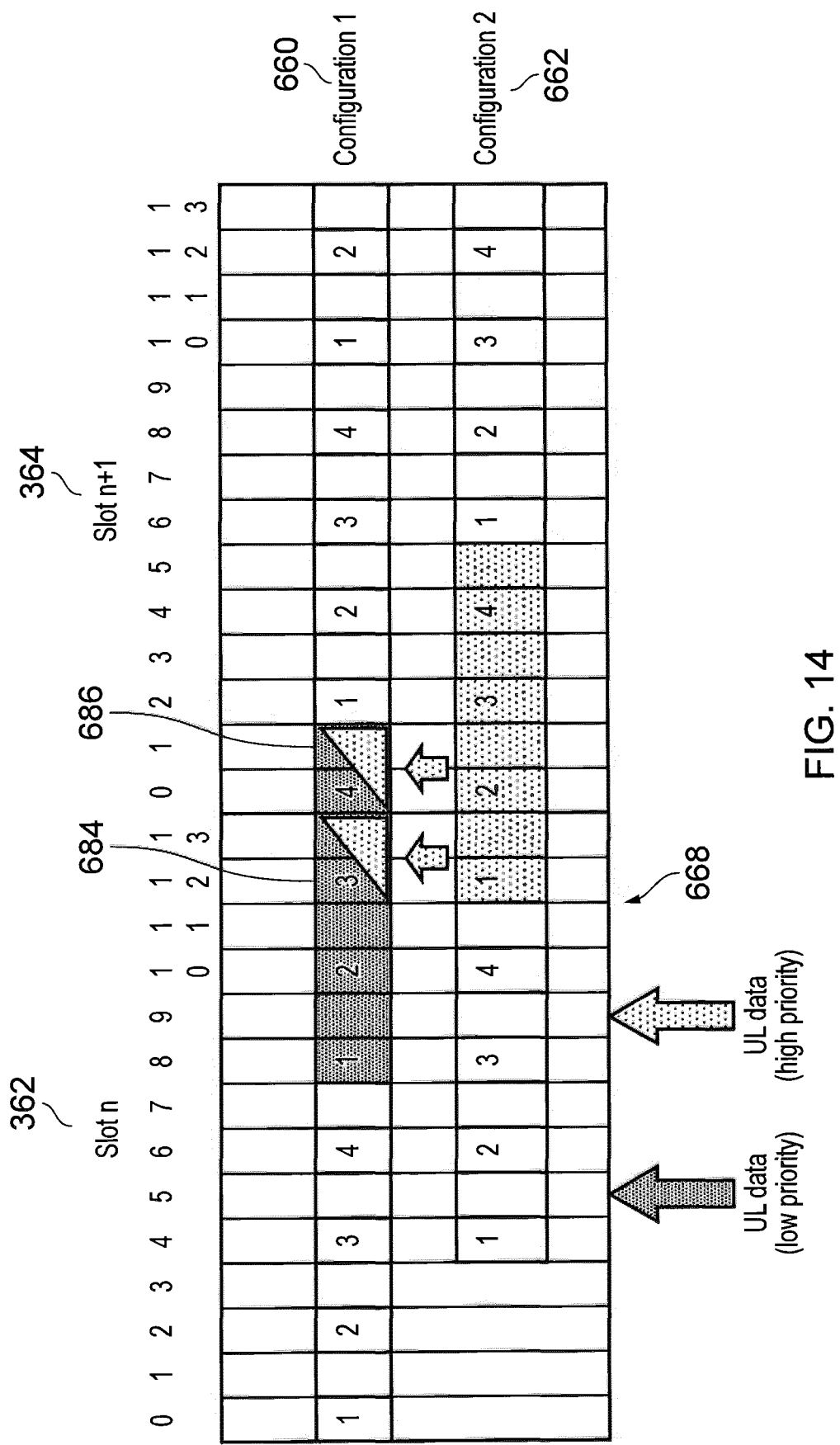
FIG. 14 is another example illustration of the example shown in FIG. 12 in which the transmitting of the uplink data according to one of the configurations includes multiplexing of the encoded data units for each of the configurations for transmission.

For example as shown in FIG. 14, on transmission of an encoded data unit as repetition 3 and 4 684, 686 (i.e. symbol 12 and 13 in slot n, and symbol 0 and 1 in slot n+1), the uplink data configured for transmission according to the first configuration 1 660 which has a lower priority than the uplink data configured for transmission according to the second configuration 2 662 having a higher priority is multiplexed and transmitted with grant free resources of the first configuration 1 660. That is the remaining repetition 3 and 4 of the uplink data of the first source configured with the configuration 1 660 is multiplexed with the transmission with the higher priority data with the second configuration 2 662 by multiplexing in frequency for example.

If the UE 270 determines that it will transmit the lower priority uplink data using multiplexing, the "UE 270 can inform the infrastructure equipment 272 (gNB) of the multiplexing. The indication can be transmitted on the grant free resources according to the first configuration 1 660 with the lower priority (check that).

Figure 15:
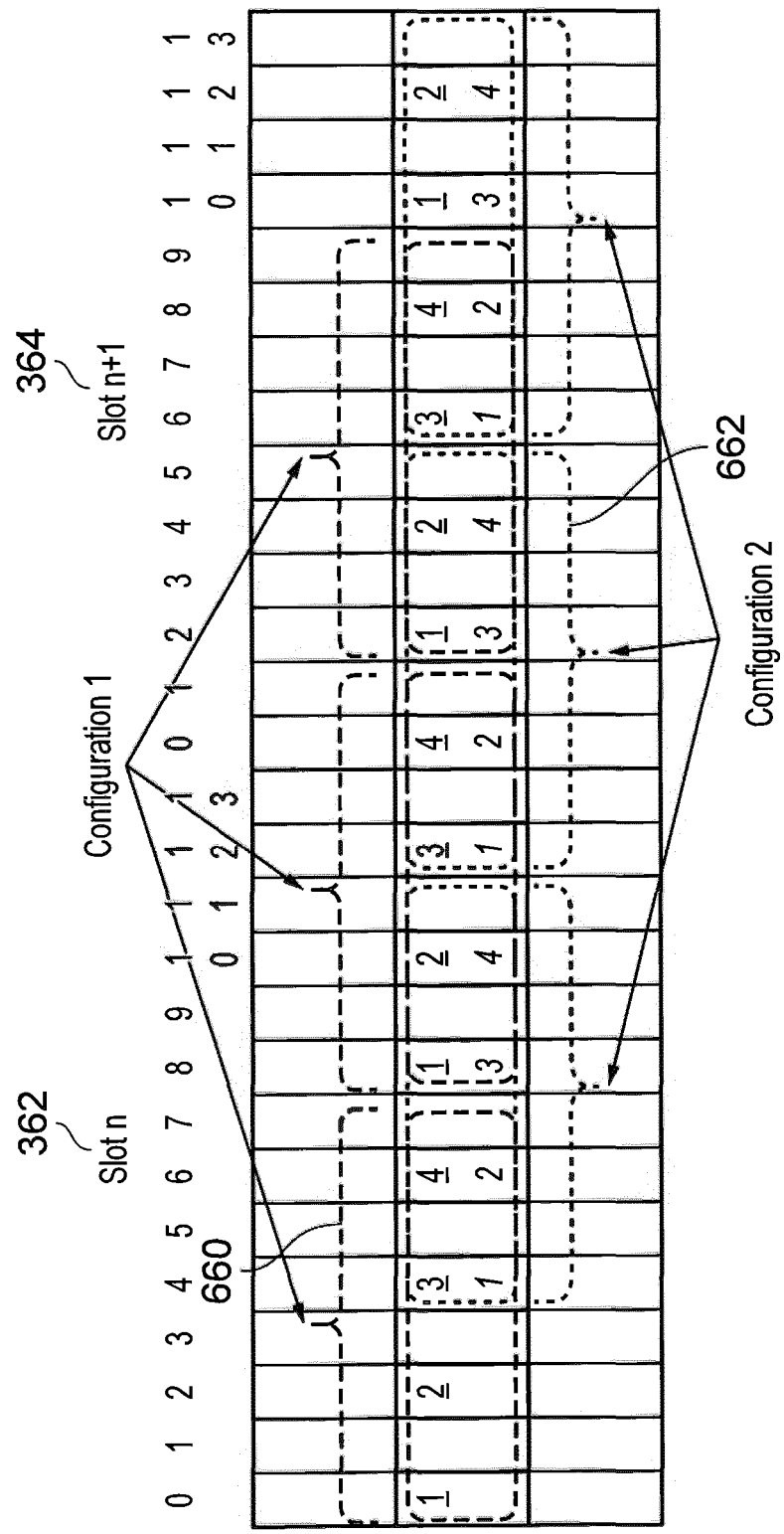
FIG. 15 is an example of the uplink transmission in grant free resources of FIG. 14 providing an illustration of multiplexing.

UE Behaviour in the Case of Overlapped Grant Free Resources in Frequency Domain Among Different Configurations In the above embodiments, uplink data is transmitted from different sources using different configurations on the grant free resources. The multiplexing may be achieved in one example by mapping the data from different sources with different configurations by mapping the data on to different frequency resources. However in other examples the data can be overlapped on the same frequency resources as shown in the example embodiment illustrated in FIG. 15. As shown in FIG. 15 uplink data is transmitted in the grant free resources according to the first configuration 1 660 (in which repetition numbers 1 to 4 are shown as underlined) or the uplink data transmitted according to the second configuration 2 662 (in which repetition numbers 1 to 4 are shown in italic font), e.g. depending on a timing of uplink data generation. In addition, a UE can explicitly or implicitly indicate to gNB which the configured grant free resources is used.

- The indication can be explicitly performed by multiplexing control information indicating which configuration is used with a uplink data.
- The indication can be implicitly performed by differentiating the following parameter for uplink data (i.e. PUSCH) among the configurations.
- Scrambling sequence of uplink data
- DMRS for uplink data; DMRS sequence, DMRS mapping pattern
- Antenna port of uplink data Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A method of operating a communications device to transmit data to a wireless communications network, the method comprising
  processing uplink data for transmission on grant free resources of a physical uplink shared channel of a wireless access interface provided by the wireless communications network to form one or more transport blocks of the uplink data for transmission, the grant free resources providing communications resources in each of a plurality of time divided units of the wireless access interface for transmitting the uplink data,
  selecting one of a plurality of configurations for transmitting the uplink data in the grant free resources, and
  transmitting the uplink data in the grant free resources according to the selected configuration, wherein each of the plurality of configurations includes grant free resources, a transmission period in which each of the encoded data units is to be transmitted in the grant free resources, and a temporal starting position of the transmission period in one of the time divided units of the wireless access interface for transmitting the uplink data in the grant free resources, the temporal starting position and the transmission period being independent for each of the plurality of configurations.

Paragraph 2. A method according to paragraph 1, wherein the processing the uplink data for transmission includes
forming the uplink data into the uplink transport blocks for transmission,
encoding each of the uplink transport blocks to encoded transport blocks,
forming from each of the encoded transport blocks a plurality of encoded data units, each of the encoded data units being formed for repeated transmission in each of a plurality of transmission occasions forming each of the transmission periods in communications resources of the grant free resources, wherein each configuration includes an independent number of repetitions for transmitting the encoded data units in the grant free resources of the physical shared uplink channel, providing for each configuration the independent transmission period.

Paragraph 3. A method according to paragraph 1 or 2, wherein each of the plurality of configurations includes independent communications parameters comprising at least one of a modulation scheme, a error correction encoding rate, a transmission bandwidth of the grant free resources, a pattern of demodulation reference signals, a beam pattern for transmission, a transmission power and a timing advance, and at least one of the encoding each of the transport blocks, forming the uplink data and the transmitting the uplink data being in accordance with the independently set communications parameters.

Paragraph 4. A method according to any of paragraphs 1 to 3, the method comprising processing first uplink data for transmission on the grant free resources according to a first of the plurality of configurations,
processing second uplink data for transmission on the grant free resources according to a second of the plurality of configurations,
transmitting the first uplink data in the grant free resources according to the selected first configuration,
determining that the second uplink data has a relative priority of transmission higher than the first uplink data, and
scheduling the transmission of the second uplink data according to the second configuration in preference to the transmission of the first uplink data in accordance with the relative priority between the first uplink data and the second uplink data.

Paragraph 5. A method according to paragraph 4, comprising transmitting the second uplink data according to the second configuration, the transmitting the second uplink data comprising
determining that transmitting one or more of the transport blocks of the first uplink data will need the same communications resources of the grant free uplink communications resources at the same time as one or more of the transport blocks of the second uplink data, and
transmitting the one or more transport blocks of the second uplink data with the second configuration having a higher priority than the first uplink data on the same communications resources which the one or more transport blocks of the first uplink data would have been transmitted instead of the one or more transport blocks of the first uplink data.

Paragraph 6. A method according to paragraph 5, wherein the transmitting the one or more of the transport blocks of the first uplink data includes transmitting the one or more transport blocks of the first uplink data having a lower priority than the second uplink data which would have been on the same communications resources in conflict with the transmitting of the one or more of the transport blocks of the second uplink data, by adapting the transmitting of the one or more of the transport blocks of the first uplink data not to conflict with the transmission of the second up link data with the higher priority.

Paragraph 7. A method according to paragraph 6, wherein the adapting the transmitting comprises stopping transmission of the one or more of the transport blocks of the first uplink data having a lower priority than the second uplink data which would have been transmitted on the same communications resources conflicting with the one or more of the transport blocks of the second uplink data.

Paragraph 8. A method according to paragraph 6, wherein the adapting the transmitting comprises postponing transmission of the one or more of the transport blocks of the first uplink data having a lower priority than the second uplink data which would have been transmitted on the same communications resources conflicting with the one or more of the transport blocks of the second uplink data, until after the transmission of the second uplink data on the grant free uplink communications resources is completed.

Paragraph 9. A method according to paragraph 6, wherein the adapting the transmitting comprises multiplexing the transmission of the one or more of the transport blocks of the first uplink data having a lower priority than the second uplink data which would have been transmitted on the same communications resources conflicting with the one or more of the transport blocks of the second uplink data.

Paragraph 10. A method according to any of paragraphs 4 to 9, wherein the grant free resources of the first configuration and the second configuration are overlapped in frequency domain.

Paragraph 11. A method according to any of paragraphs 4 to 9, comprising transmitting an indication to a receiver of the first uplink data of the adapting the transmitting of the first uplink data.

Paragraph 12. A communications device configured to transmit data to a wireless communications network, the communications device comprising
transmitter circuitry configured to transmit signals via a wireless access interface provided by the wireless communications network, and
controller circuitry configured in combination with the transmitter circuitry
to process uplink data for transmission on grant free resources of a physical uplink shared channel of a wireless access interface provided by the wireless communications network to form one or more transport blocks of the uplink data for transmission, the grant free resources providing communications resources in each of a plurality of time divided units of the wireless access interface for transmitting the uplink data,
to select one of a plurality of configurations for transmitting the uplink data in the grant free resources, and
to transmit the uplink data in the grant free resources according to the selected configuration, wherein each of the plurality of configurations includes grant free resources, a transmission period in which each of the encoded data units is to be transmitted in the grant free resources, and a temporal starting position of the transmission period in one of the time divided units of the wireless access interface for transmitting the uplink data in the grant free resources, the temporal starting position and the transmission period being independent for each of the plurality of configurations.

Paragraph 13. A communications device according to paragraph 12, wherein the controller circuitry is configured with the transmitter circuitry to form the uplink data into the uplink transport blocks for transmission, to encode each of the uplink transport blocks to encoded transport blocks, to form from each of the encoded transport blocks a plurality of encoded data units, each of the encoded data units being formed for repeated transmission in each of a plurality of transmission occasions forming each of the transmission periods in communications resources of the grant free resources, wherein each configuration includes an independent number of repetitions for transmitting the encoded data units in the grant free resources of the physical shared uplink channel, providing for each configuration the independent transmission period.

Paragraph 14. A communications device according to paragraph 12 or 13, wherein each of the plurality of configurations includes independent communications parameters comprising at least one of a modulation scheme, an error correction encoding rate, a transmission bandwidth of the grant free resources, a pattern of demodulation reference signals, a beam pattern for transmission, a transmission power and a timing advance, and at least one of the encoding each of the transport blocks, forming the uplink data and the transmitting the uplink data being in accordance with the independently set communications parameters.

Paragraph 15. A communications device according to any of paragraphs 12 to 14, wherein the controller circuitry is configured with the transmitter circuitry to process first uplink data for transmission on the grant free resources according to a first of the plurality of configurations, to process second uplink data for transmission on the grant free resources according to a second of the plurality of configurations, to transmit the first uplink data in the grant free resources according to the selected first configuration, to determine that the second uplink data has a relative priority of transmission higher than the first uplink data, and to schedule the transmission of the second uplink data according to the second configuration in preference to the transmission of the first uplink data in accordance with the relative priority between the first uplink data and the second uplink data.

Paragraph 16. A communications device according to paragraph 15, wherein the controller circuitry is configured with the transmitter circuitry to determine that transmitting one or more of the transport blocks of the first uplink data will need the same communications resources of the grant free uplink communications resources at the same time as one or more of the transport blocks of the second uplink data, and to transmit the one or more transport blocks of the second uplink data with the second configuration having a higher priority than the first uplink data on the same communications resources which the one or more transport blocks of the first uplink data would have been transmitted instead of the one or more transport blocks of the first uplink data.

Paragraph 17. A communications device according to paragraph 16, wherein the controller circuitry is configured with the transmitter circuitry to transmit the one or more transport blocks of the first uplink data having a lower priority than the second uplink data which would have been on the same communications resources in conflict with the transmitting of the one or more of the transport blocks of the second uplink data, by adapting the transmitting of the one or more of the transport blocks of the first uplink data not to conflict with the transmission of the second up link data with the higher priority.

Paragraph 18. Circuitry configured to transmit data to a wireless communications network, the circuitry comprising transmitter circuitry configured to transmit signals via a wireless access interface provided by the wireless communications network, and controller circuitry configured in combination with the transmitter circuitry to process uplink data for transmission on grant free resources of a physical uplink shared channel of a wireless access interface provided by the wireless communications network to form one or more transport blocks of the uplink data for transmission, the grant free resources providing communications resources in each of a plurality of time divided units of the wireless access interface for transmitting the uplink data, to select one of a plurality of configurations for transmitting the uplink data in the grant free resources, and to transmit the uplink data in the grant free resources according to the selected configuration, wherein each of the plurality of configurations includes grant free resources, a transmission period in which each of the encoded data units is to be transmitted in the grant free resources, and a temporal starting position of the transmission period in one of the time divided units of the wireless access interface for transmitting the uplink data in the grant free resources, the temporal starting position and the transmission period being independent for each of the plurality of configurations.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-172834, "Work Item on New Radio (NR) Access Technology," NTT DOCOMO, RAN #78
[3] RP-181477, "New SID on Physical Layer Enhancements for NR URLLC," Huawei, HiSilicon, Nokia, Nokia Shanghai Bell, RAN #80.
[4] R1-1809979, Summary of 7.2.6.3 Enhanced UL grant-free transmissions, NTT DOCOMO, RAN1 #94.

Annex 1

LTE Wireless Access Interface

Embodiments of the present technique are not limited to a particular wireless communications standard, but find general application with a mobile communications system in which a transmitter and a receiver are configured to communicate data in units, transport blocks or packets for which some indication of feedback is provided as part of an ARQ type protocol. However, the following example embodiments will be explained with reference to a 3GPP defined LTE architecture. Those acquainted with LTE will appreciate that a wireless access interface configured in accordance with an LTE standard uses an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 16 and 17.

FIG. 16 provides a simplified schematic diagram of the structure of a downlink of a wireless access interface that may be provided by or in association with the eNB of FIG. 1 when the communications system is operating in accordance with the LTE standard. In LTE systems the wireless access interface of the downlink from an eNB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used to carry reference information used for channel estimation at the receiver for example) whilst some at the edge of the band are not used at all. For LTE, the number of subcarriers varies between 72 subcarriers (1.4 MHz) and 1200 subcarriers (20 MHz), but it will be appreciated that for other wireless access interfaces, such as NR or 5G, the number of sub-carriers and the bandwidth may be different. In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz.

As shown in FIG. 16, the resources of the wireless access interface are also temporally divided into frames where a frame 200 lasts 10 ms and is subdivided into 10 sub-frames 1201 each with a duration of 1 ms. Each sub-frame 201 is formed from 14 OFDM symbols and is divided into two slots 1220, 1222 each of which comprise six or seven OFDM symbols depending on whether a normal or extended cyclic prefix is being utilised within OFDM symbols for the reduction of inter symbol interference. The resources within a slot may be divided into resources blocks 1203 each comprising 12 subcarriers for the duration of one slot and the resource blocks are further divided into resource elements 1204 which span one subcarrier for one OFDM symbol, where each rectangle 1204 represents a resource element. The resource elements distributed in time within a sub-frame and frequency across the host system bandwidth represent the communications resources of the host system.

The simplified structure of the downlink of an LTE wireless access interface presented in FIG. 14, also includes an illustration of each sub-frame 1201, which comprises a control region 1205 for the transmission of control data, a data region 1206 for the transmission of user data and reference signals 207 which are interspersed in the control and data regions in accordance with a predetermined pattern. The control region 1205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data or control, such as a physical downlink shared channel (PDSCH), enhanced physical downlink control channel (ePDCCH) and a physical broadcast channel (PBCH). Although these physical channels provide a wide range of functionality to LTE systems, in terms of resource allocation and the present disclosure, PDCCH and PDSCH are most relevant. Further information on the structure and functioning of the physical channels of LTE systems can be found in [1].

Resources within the PDSCH may be allocated by an eNodeB to UEs being served by the eNodeB. For example, a number of resource blocks of the PDSCH may be allocated to a UE in order that it may receive data that it had previously requested or data which is being pushed to it by the eNodeB, such as radio resource control (RRC) signalling. In FIG. 14, UE1 has been allocated resources 1208 of the data region 1206, UE2 resources 1209 and UE3 resources 1210. UEs in an LTE system may be allocated a fraction of the available resources for the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same sub-frame.

FIG. 17 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations sub-frames switch between uplink and downlink sub-frames in accordance with predefined patterns. However, regardless of the form of duplexing used, a common uplink frame structure is utilised. The simplified structure of FIG. 3 illustrates such an uplink frame in an FDD implementation. A frame 300 is divided into 10 sub-frames 301 of 1 ms duration where each sub-frame 301 comprises two slots 302 of 0.5 ms duration. Each slot 302 is then formed from seven OFDM symbols 303 where a cyclic prefix 304 is inserted between each symbol in a manner equivalent to that in downlink sub-frames.

As shown in FIG. 17, each LTE uplink sub-frame may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink sub-frames may also include reference signals. For example, demodulation reference signals (DMRS) 307 and sounding reference signals (SRS) 308 may be present in an uplink sub-frame where the DMRS occupy the fourth symbol of a slot in which PUSCH is transmitted and are used for decoding of PUCCH and PUSCH data, and where SRS are used for uplink channel estimation at the eNodeB. The ePDCCH channel carries similar control information (DCI) as the PDCCH, but the physical aspects of PDCCH are different to those of ePDCCH, as discussed elsewhere herein. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink sub-frames, uplink sub-frames have a different control structure to downlink sub-frames, in particular the upper 309 and lower 310 subcarriers/frequencies/resource blocks of an uplink sub-frame are reserved for control signalling rather than the initial symbols of a downlink sub-frame. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulated in combination and therefore if efficient use of the available resources are to be made, contiguous frequency allocations for each UE may be preferable.

What is claimed is:

1. A method of operating a communications device to transmit data to a wireless communications network, the method comprising:
 processing first uplink data and second uplink data for transmission on grant free resources of a physical uplink shared channel of a wireless access interface provided by the wireless communications network, the grant free resources providing communications resources in each of a plurality of time divided units of the wireless access interface for transmitting the first uplink data and the second uplink data, the first uplink data being processed for transmission in the grant free resources according to a first configuration of the plurality of configurations, and the second uplink data being processed for transmission in the grant free resources according to a second configuration of the plurality of configurations,
 determining that transmission according to the second configuration has a relative priority which is higher than transmission according to the first configuration,
 scheduling transmission of the second uplink data according to the second configuration in preference to transmission of the first uplink data in accordance with the relative priority between the first configuration and the second configuration, and
 transmitting the second uplink data in the grant free resources according to the selected second configuration, wherein
 the first configuration includes a transmission period, for transmitting one or more transport blocks of the first uplink data in the grant free resources, and a starting position of the transmission period of the first uplink data in one of the time divided units of the wireless access interface for transmitting the first uplink data in the grant free resources, and the second configuration includes a transmission period for transmitting the one or more transport blocks of the second uplink data in the grant free resources, and a starting position of the transmission period of the second uplink data in one of the time divided units of the wireless access interface for transmitting the second data in the grant free resources, the starting position and the transmission period being independent for the first configuration and the second configuration.

2. The method according to claim 1, wherein the processing the uplink data for transmission includes:
  forming the first uplink data and the second uplink data into the uplink transport blocks for transmission,
  encoding each of transport blocks of the first uplink data and the transport blocks of the second uplink data to encoded transport blocks,
  forming from each of the encoded transport blocks a plurality of encoded data units, each of the encoded data units being formed for repeated transmission in each of a plurality of transmission occasions forming each of the transmission periods in communications resources of the grant free resources,
  wherein each configuration includes an independent number of repetitions for transmitting the encoded data units in the grant free resources of the physical shared uplink channel, providing for each configuration the independent transmission period.

3. The method according to claim 1, wherein each of the plurality of configurations includes independent communications parameters comprising at least one of a modulation scheme, an error correction encoding rate, a transmission bandwidth of the grant free resources, a pattern of demodulation reference signals, a beam pattern for transmission, a transmission power and a timing advance, and at least one of the encoding each of the transport blocks, forming the uplink data and the transmitting the uplink data being in accordance with the independently set communications parameters.

4. The method according to claim 1, wherein, the transmitting the second uplink data includes:
  determining that transmitting one or more of the transport blocks of the first uplink data will need the same communications resources of the grant free uplink communications resources at the same time as one or more of the transport blocks of the second uplink data, and
  transmitting the one or more transport blocks of the second uplink data with the second configuration having a higher priority than the first uplink data on the same communications resources which the one or more transport blocks of the first uplink data would have been transmitted instead of the one or more transport blocks of the first uplink data.

5. The method according to claim 4, wherein the transmitting the one or more of the transport blocks of the first uplink data includes transmitting the one or more transport blocks of the first uplink data having a lower priority than the second uplink data which would have been on the same communications resources in conflict with the transmitting of the one or more of the transport blocks of the second uplink data, by adapting the transmitting of the one or more of the transport blocks of the first uplink data not to conflict with the transmission of the second up link data with the higher priority.

6. The method according to claim 5, wherein the adapting the transmitting comprises stopping transmission of the one or more of the transport blocks of the first uplink data having a lower priority than the second uplink data which would have been transmitted on the same communications resources conflicting with the one or more of the transport blocks of the second uplink data.

7. The method according to claim 5, wherein the adapting the transmitting comprises postponing transmission of the one or more of the transport blocks of the first uplink data having a lower priority than the second uplink data which would have been transmitted on the same communications resources conflicting with the one or more of the transport blocks of the second uplink data, until after the transmission of the second uplink data on the grant free uplink communications resources is completed.

8. The method according to claim 5, wherein the adapting the transmitting comprises multiplexing the transmission of the one or more of the transport blocks of the first uplink data having a lower priority than the second uplink data which would have been transmitted on the same communications resources conflicting with the one or more of the transport blocks of the second uplink data.

9. The method according to claim 1, wherein the grant free resources of the first configuration and the second configuration are overlapped in frequency domain.

10. The method according to claim 5, comprising:
  transmitting an indication to a receiver of the first uplink data of the adapting of the transmitting of the one or more of the transport blocks of the first uplink data.

11. The method according to claim 1, wherein each of the plurality of configurations includes a different modulation and coding scheme.

12. The method according to claim 1, wherein each of the plurality of configurations includes at least one of a different bandwidth and a different demodulation reference sequence density and pattern.

13. The method according to claim 1, wherein the first uplink data corresponds to a first physical uplink channel (PUSCH) and the second uplink data corresponds to a second PUSCH.

14. A communications device configured to transmit data to a wireless communications network, the communications device comprising:
  transmitter circuitry configured to transmit signals via a wireless access interface provided by the wireless communications network, and
  controller circuitry configured in combination with the transmitter circuitry
  to process first uplink data and second uplink data for transmission on grant free resources of a physical uplink shared channel of a wireless access interface provided by the wireless communications network, the grant free resources providing communications resources in each of a plurality of time divided units of the wireless access interface for transmitting the first uplink data and the second uplink data, the first uplink data being processed for transmission in the grant fee resources according to a first configuration of the plurality of configurations, and the second uplink data being processed for transmission in the grant free resources according to a second configuration of the plurality of configurations,
  to determine that transmission according to the second configuration has a relative priority which is higher than transmission according to the first configuration,
  to schedule transmission of the second uplink data according to the selected second configuration in preference to transmission of the first uplink data in accordance with the relative priority between the first configuration and the second configuration, and to transmit the second uplink data in the grant free resources according to the selected second configuration, wherein the first configuration includes a transmission period for transmitting one or more transport blocks of the first uplink data in the grant free resources, and a starting position of the transmission period of the first uplink data in one of the time divided units of the wireless access interface for transmitting the first uplink data in the grant free resources, and the second configuration includes a transmission period for transmitting one or more blocks of the second uplink data in the grant free resources, and a starting position of the transmission period of the second uplink data in one of the time divided unites of the wireless access interface for transmitting the second uplink data in the grant free resources, the starting position and the transmission period being independent for the first configuration and the second configuration.

15. The communications device according to claim 14, wherein the controller circuitry is configured with the transmitter circuitry to form the first uplink data and the second uplink data into the transport blocks for transmission, to encode each of the transport blocks to encoded transport blocks, to form from each of the encoded transport blocks a plurality of encoded data units, each of the encoded data units being formed for repeated transmission in each of a plurality of transmission occasions forming each of the transmission periods in communications resources of the grant free resources, wherein each configuration includes an independent number of repetitions for transmitting the encoded data units in the grant free resources of the physical shared uplink channel, providing for each configuration the independent transmission period.

16. The communications device according to claim 14, wherein each of the plurality of configurations includes independent communications parameters comprising at least one of a modulation scheme, an error correction encoding rate, a transmission bandwidth of the grant free resources, a pattern of demodulation reference signals, a beam pattern for transmission, a transmission power and a timing advance, and at least one of the encoding each of the transport blocks, forming the uplink data and the transmitting the uplink data being in accordance with the independently set communications parameters.

17. The communications device according to claim 14, wherein the controller circuitry is configured with the transmitter circuitry to determine that transmitting one or more of the transport blocks of the first uplink data will need the same communications resources of the grant free uplink communications resources at the same time as one or more of the transport blocks of the second uplink data, and to transmit the one or more transport blocks of the second uplink data with the second configuration having a higher priority than the first uplink data on the same communications resources which the one or more transport blocks of the first uplink data would have been transmitted instead of the one or more transport blocks of the first uplink data.

18. The communications device according to claim 17, wherein the controller circuitry is configured with the transmitter circuitry to transmit the one or more transport blocks of the first uplink data having a lower priority than the second uplink data which would have been on the same communications resources in conflict with the transmitting of the one or more of the transport blocks of the second uplink data, by adapting the transmitting of the one or more of the transport blocks of the first uplink data not to conflict with the transmission of the second up link data with the higher priority.

19. Circuitry configured to transmit data to a wireless communications network, the circuitry comprising:

transmitter circuitry configured to transmit signals via a wireless access interface provided by the wireless communications network, and controller circuitry configured in combination with the transmitter circuitry to process first uplink data and second uplink data for transmission on grant free resources of a physical uplink shared channel of a wireless access interface provided by the wireless communications network, the grant free resources providing communications resources in each of a plurality of time divided units of the wireless access interface for transmitting the first uplink data and the second uplink data, the first uplink data being processed for transmission in the grant free resources according to a first configuration of the plurality of configurations, and the second uplink data being processed for transmission in the grant free resources according to a second configuration of the plurality of configurations, to determine that transmission according to the second configuration has a relative priority which is higher than transmission according to the first configuration, to schedule transmission of the second uplink data according to the second configuration in preference to transmission of the first uplink data in accordance with the relative priority between the first configuration and the second configuration, and to transmit the second uplink data in the grant free resources according to the selected second configuration, wherein the first configuration a transmission period for transmitting one or more transport blocks of the first uplink data in the grant free resources, and a starting position of the transmission period of the first uplink data in one of the time divided units of the wireless access interface for transmitting the first uplink data in the grant free resources, and the second configuration includes a transmission period for transmitting one or more blocks of the second uplink data in the grant free resources, and a starting position of the transmission period of the second uplink data in one of the time divided units of the wireless access interface for transmitting the second uplink data in the grant free resources, the starting position and the transmission period being independent for the first configuration and the second configuration.

* * * * *